(12) United States Patent
Evans

(10) Patent No.: US 7,440,622 B2
(45) Date of Patent: Oct. 21, 2008

(54) SYSTEM AND METHOD FOR ARRANGING CONCEPT CLUSTERS IN THEMATIC NEIGHBORHOOD RELATIONSHIPS IN A SHAPED TWO-DIMENSIONAL VISUAL DISPLAY SPACE

(75) Inventor: Lynne Marie Evans, Renton, WA (US)

(73) Assignee: Attenex Corporation, Seattle, WA (US)

(*) Notice: Subject to any disclaimer, the term of this patent is extended or adjusted under 35 U.S.C. 154(b) by 994 days.

(21) Appl. No.: 10/911,375

(22) Filed: Aug. 3, 2004

(65) Prior Publication Data

US 2005/0192956 A1    Sep. 1, 2005

Related U.S. Application Data

(63) Continuation-in-part of application No. 10/778,416, filed on Feb. 13, 2004, now Pat. No. 7,191,175.

(51) Int. Cl.
G06K 9/62 (2006.01)
G06F 17/30 (2006.01)
G06T 11/20 (2006.01)

(52) U.S. Cl. .................. 382/225; 707/5; 345/440

(58) Field of Classification Search .......... 382/181, 382/190, 209, 224, 225, 305; 345/440, 467; 707/1–10
See application file for complete search history.

(56) References Cited

U.S. PATENT DOCUMENTS

| | | | |
|---|---|---|---|
| 5,056,021 A | | 10/1991 | Ausborn |
| 5,488,725 A | | 1/1996 | Turtle et al. |
| 6,137,911 A | * | 10/2000 | Zhilyaev ............... 382/225 |
| 6,173,275 B1 | | 1/2001 | Caid et al. |
| 6,446,061 B1 | | 9/2002 | Doerre et al. |
| 6,510,406 B1 | | 1/2003 | Marchisio |
| 6,523,026 B1 | * | 2/2003 | Gillis ...................... 707/3 |
| 6,560,597 B1 | | 5/2003 | Dhillon et al. |
| 6,598,054 B2 | * | 7/2003 | Schuetze et al. ........ 707/103 R |
| 6,675,159 B1 | | 1/2004 | Lin et al. |

(Continued)

OTHER PUBLICATIONS

Christina Yip Chung et al, "Thematic Mapping—From Unstructured Documents to Taxonomies," CIKM'02, Nov. 4-9, 2002, pp. 608-610, ACM, McLean, Virginia, USA.

(Continued)

Primary Examiner—Daniel G Mariam
(74) Attorney, Agent, or Firm—Patrick J. S. Inouye; Krista A. Wittman

(57) ABSTRACT

A set of clusters is selected from a concept space including clusters with concepts extracted to visualize document content. A theme is identified in each of the clusters. Each theme includes a concept ranked within the cluster. Unique candidate spines including clusters sharing at least one common theme are logically formed. The clusters are assigned to one such candidate spine having a substantially best fit. Each best fit candidate spine sufficiently unique from each other such best fit candidate spine is identified. The identified best fit candidate spine is placed in a visual display space. A similarity between each non-identified best fit candidate spine and each placed best fit candidate spine is evaluated. Each non-identified best fit candidate spine is placed in the visual display space relative to an anchor cluster on the placed best fit candidate spine that is sufficiently similar to the non-identified best fit candidate spine.

40 Claims, 28 Drawing Sheets

U.S. PATENT DOCUMENTS 6,701,305 B1    3/2004    Holt et al.
6,711,585 B1    3/2004    Copperman et al.
6,888,548 B1 *    5/2005    Gallivan .................... 345/440

OTHER PUBLICATIONS

Hiroyuki Kawano, "Overview of Mondou Web Search Engine Using Text Mining and Information Visualizing Technologies," IEEE, 2001, pp. 234-241.

James Osborn et al "Justice: A Judicial Search Tool Using Intelligent Concept Extraction," ICAIL-99, 1999, pp. 173-181, ACM.

Chen An et al "Fuzzy Concept Graph and Application in Web Document Clustering," 2001, pp. 101-106, IEEE.

* cited by examiner

140

330

SYSTEM AND METHOD FOR ARRANGING CONCEPT CLUSTERS IN THEMATIC NEIGHBORHOOD RELATIONSHIPS IN A SHAPED TWO-DIMENSIONAL VISUAL DISPLAY SPACE

CROSS-REFERENCE TO RELATED APPLICATIONS

This patent application is a continuation-in-part of U.S. patent application Ser. No. 10/778,416, filed Feb. 13, 2004, now U.S. Pat. No. 7,191,175, the priority date of which is claimed and the disclosure of which is incorporated by reference.

FIELD OF THE INVENTION

The present invention relates in general to data visualization and, in particular, to a system and method for arranging concept clusters in thematic neighborhood relationships in a shaped two-dimensional visual display space.

BACKGROUND OF THE INVENTION

In general, data visualization transforms numeric or textual information into a graphical display format to assist users in understanding underlying trends and principles in the data. Effective data visualization complements and, in some instances, supplants numbers and text as a more intuitive visual presentation format than raw numbers or text alone. However, graphical data visualization is constrained by the physical limits of computer display systems. Two-dimensional and three-dimensional visualized information can be readily displayed. However, visualized information in excess of three dimensions must be artificially compressed if displayed on conventional display devices. Careful use of color, shape and temporal attributes can simulate multiple dimensions, but comprehension and usability become difficult as additional layers of modeling are artificially grafted into a two- or three-dimensional display space.

Mapping multi-dimensional information into a two- or three-dimensional display space potentially presents several problems. For instance, a viewer could misinterpret dependent relationships between discrete objects displayed adjacently in a two or three dimensional display. Similarly, a viewer could erroneously interpret dependent variables as independent and independent variables as dependent. This type of problem occurs, for example, when visualizing clustered data, which presents discrete groupings of related data. Other factors further complicate the interpretation and perception of visualized data, based on the Gestalt principles of proximity, similarity, closed region, connectedness, good continuation, and closure, such as described in R. E. Horn, "Visual Language: Global Communication for the 21$^{st}$ Century," Ch. 3, MacroVU Press (1998), the disclosure of which is incorporated by reference.

Conventionally, objects, such as clusters, modeled in multi-dimensional concept space are generally displayed in two- or three-dimensional display space as geometric objects. Independent variables are modeled through object attributes, such as radius, volume, angle, distance and so forth. Dependent variables are modeled within the two or three dimensions. However, poor cluster placement within the two or three dimensions can mislead a viewer into misinterpreting dependent relationships between discrete objects.

Consider, for example, a group of clusters, which each contain a group of points corresponding to objects sharing a common set of traits. Each cluster is located at some distance from a common origin along a vector measured at a fixed angle from a common axis. The radius of each cluster reflects the number of objects contained. Clusters located along the same vector are similar in traits to those clusters located on vectors separated by a small cosine rotation. However, the radius and distance of each cluster from the common origin are independent variables relative to other clusters. When displayed in two dimensions, the overlaying or overlapping of clusters could mislead the viewer into perceiving data dependencies between the clusters where no such data dependencies exist.

Conversely, multi-dimensional information can be advantageously mapped into a two- or three-dimensional display space to assist with comprehension based on spatial appearances. Consider, as a further example, a group of clusters, which again each contain a group of points corresponding to objects sharing a common set of traits and in which one or more "popular" concepts or traits frequently appear in some of the clusters. Since the distance of each cluster from the common origin is an independent variable relative to other clusters, those clusters that contain popular concepts or traits may be placed in widely separated regions of the display space and could similarly mislead the viewer into perceiving no data dependencies between the clusters where such data dependencies exist.

The placement of cluster groups within a two-dimensional display space, such as under a Cartesian coordinate system, also imposes limitations on semantic interrelatedness, density and user interface navigation. Within the display space, cluster groups can be formed into "spines" of semantically-related clusters, which can be placed within the display space with semantically-related groups of cluster spines appearing proximally close to each other and semantically-unrelated cluster spine groups appearing in more distant regions. This form of cluster spine group placement, however, can be potentially misleading. For instance, larger cluster spine groups may need to be placed to accommodate the placement of smaller cluster spine groups while sacrificing the displaying of the semantic interrelatedness of the larger cluster spine groups. Moreover, the density of the overall display space is limited pragmatically and the placement of too many cluster spine groups can overload the user. Finally, navigation within such a display space can be unintuitive and cumbersome, as large cluster spine group placement is driven by available display space and the provisioning of descriptive labels necessarily overlays or intersects placed cluster spine groups.

One approach to depicting thematic relationships between individual clusters applies a force-directed or "spring" algorithm. Clusters are treated as bodies in a virtual physical system. Each body has physics-based forces acting on or between them, such as magnetic repulsion or gravitational attraction. The forces on each body are computed in discrete time steps and the positions of the bodies are updated. However, the methodology exhibits a computational complexity of order $O(n^2)$ per discrete time step and scales poorly to cluster formations having a few hundred nodes. Moreover, large groupings of clusters tend to pack densely within the display space, thereby losing any meaning assigned to the proximity of related clusters.

Therefore, there is a need for an approach to providing a visual display space reflecting tighter semantic interrelatedness of cluster spine groups with increased display density. Preferably, such an approach would further form the cluster spine groups by semantically relating entire cluster spines, rather than individual anchor points within each cluster spine.

There is a further need for an approach to orienting semantically-related cluster spine groups within a two-dimensional visual display space relative to a common point of reference, such as a circle. Preferably, such an approach would facilitate improved user interface features through increased cluster spine group density and cluster spine group placement allowing improved descriptive labeling.

SUMMARY OF THE INVENTION

Relationships between concept clusters are shown in a two-dimensional display space by combining connectedness and proximity. Clusters sharing "popular" concepts are identified by evaluating thematically-closest neighboring clusters, which are assigned into linear cluster spines arranged to avoid object overlap. The cluster arrangement methodology exhibits a highly-scalable computational complexity of order O(n).

An embodiment provides a system and method for arranging concept clusters in thematic neighborhood relationships in a shaped two-dimensional visual display space. A set of clusters is selected from a concept space. The concept space includes a multiplicity of clusters with concepts visualizing document content based on extracted concepts. A theme in each of a plurality of the clusters is identified. Each theme includes at least one such concept ranked within the cluster. A plurality of unique candidate spines is logically formed. Each candidate spine includes clusters commonly sharing at least one such concept. One or more of the clusters are assigned to one such candidate spine having a substantially best fit. Each best fit candidate spine sufficiently unique from each other such best fit candidate spine is identified. The identified best fit candidate spine is placed in a visual display space. Each non-identified best fit candidate spine is placed in the visual display space relative to an anchor cluster on one such identified best fit candidate spine.

A further embodiment provides a system and method for arranging concept clusters in thematic neighborhood relationships in a shaped two-dimensional visual display space. A set of clusters is selected from a concept space including a multiplicity of clusters with concepts extracted to visualize document content. A theme is identified in each of a plurality of the clusters. Each theme includes at least one such concept ranked within the cluster. A plurality of unique candidate spines including clusters sharing at least one common theme is logically formed. One or more of the clusters are assigned to one such candidate spine having a substantially best fit. Each best fit candidate spine sufficiently unique from each other such best fit candidate spine is identified. The identified best fit candidate spine is placed in a visual display space. A similarity between each non-identified best fit candidate spine and each placed best fit candidate spine is evaluated. Each non-identified best fit candidate spine is placed in the visual display space relative to an anchor cluster on the placed best fit candidate spine that is sufficiently similar to the non-identified best fit candidate spine.

Still other embodiments of the present invention will become readily apparent to those skilled in the art from the following detailed description, wherein are one embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

GLOSSARY

Concept: One or more preferably root stem normalized words defining a specific meaning.

Theme: One or more concepts defining a semantic meaning.

Cluster: Grouping of documents containing one or more common themes.

Spine: Grouping of clusters sharing a single concept preferably arranged linearly along a vector. Also referred to as a cluster spine.

Spine Group: Set of connected and semantically-related spines.

The foregoing terms are used throughout this document and, unless indicated otherwise, are assigned the meanings presented above.

System Overview

Figure 1:
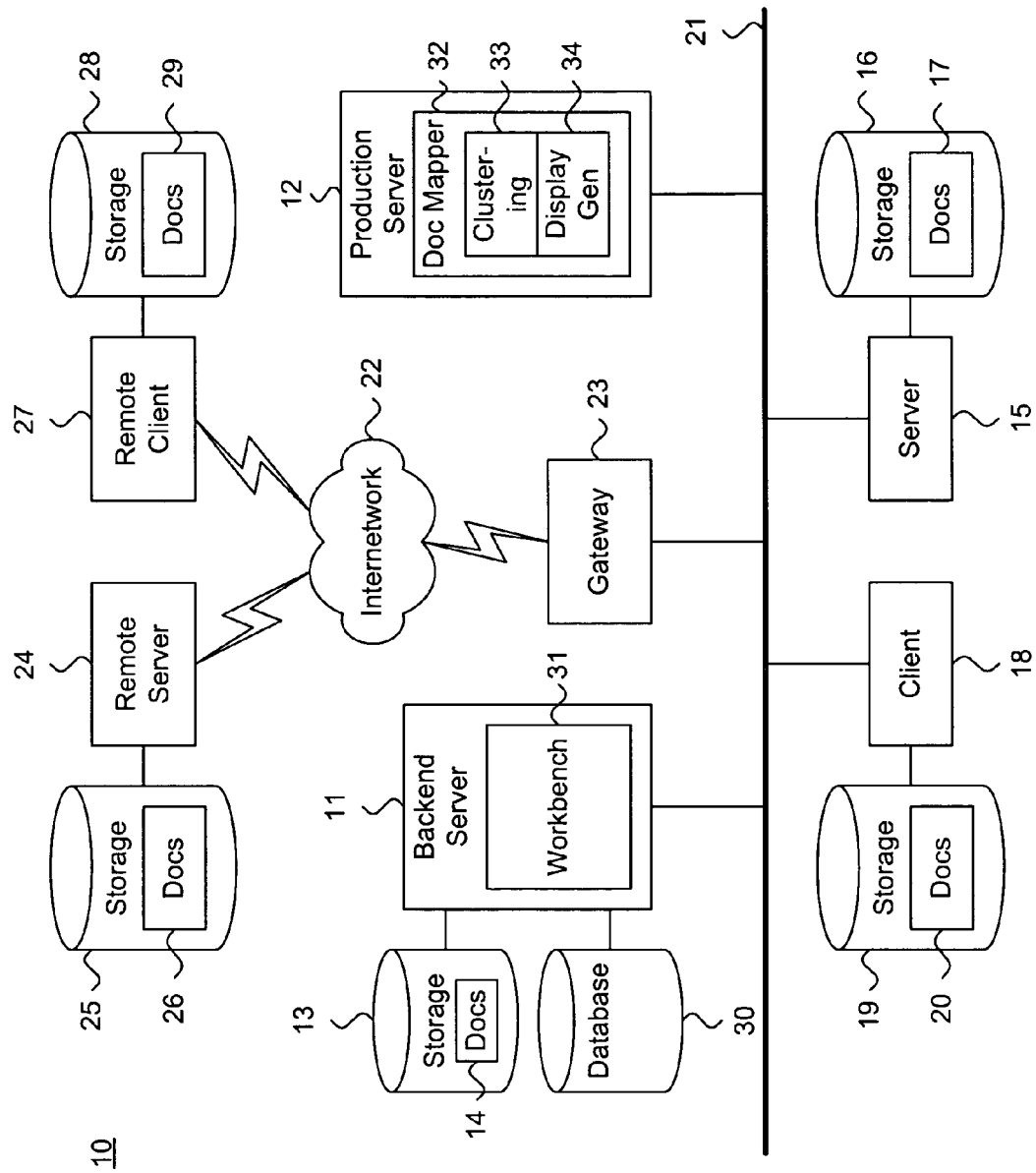
FIG. 1 is a block diagram showing a system for arranging concept clusters in thematic neighborhood relationships in a shaped two-dimensional visual display space, in accordance with the present invention.

FIG. 1 is a block diagram showing a system 10 for arranging concept clusters in thematic neighborhood relationships in a shaped two-dimensional visual display space, in accordance with the present invention. By way of illustration, the system 10 operates in a distributed computing environment, which includes a plurality of heterogeneous systems and document sources. A backend server 11 executes a workbench suite 31 for providing a user interface framework for automated document management, processing and analysis. The backend server 11 is coupled to a storage device 13, which stores documents 14, in the form of structured or unstructured data, and a database 30 for maintaining document information. A production server 12 includes a document mapper 32, that includes a clustering engine 33 and display generator 34. The clustering engine 33 performs efficient document scoring and clustering, such as described in commonly-assigned U.S. patent application Ser. No. 10/626,984, filed Jul. 25, 2003, pending, the disclosure of which is incorporated by reference. The display generator 34 arranges concept clusters in thematic neighborhood relationships in a two-dimensional visual display space, as further described below beginning with reference to FIG. 2.

The document mapper 32 operates on documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the production system 11 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of structured and unstructured data, including electronic message stores, such as word processing documents, electronic mail (email) folders, Web pages, and graphical or multimedia data. Notwithstanding, the documents could be in the form of organized data, such as stored in a spreadsheet or database.

In one embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including backend server 11, production server 32, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Display Generator

Figure 2:
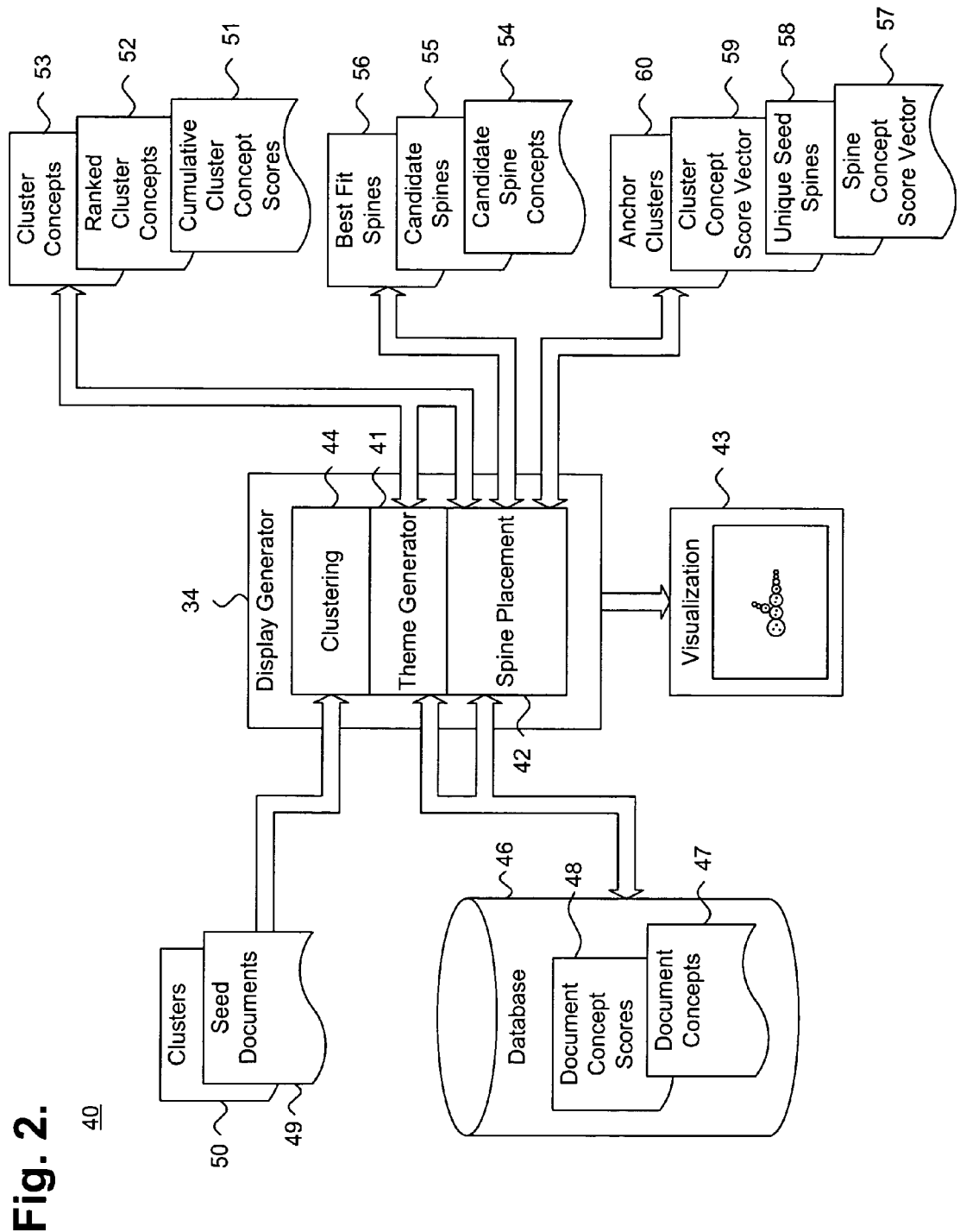
FIG. 2 is a block diagram showing the system modules implementing the display generator of FIG. 1.

FIG. 2 is a block diagram 40 showing the system modules implementing the display generator 34 of FIG. 1. The display generator 34 includes clustering 44, theme generator 41 and spine placement 42 components and maintains attached storage 44 and database 46. Individual documents 14 are analyzed by the clustering component 44 to form clusters 50 of semantically scored documents, such as described in commonly-assigned U.S. patent application Ser. No. 10/626,984, filed Jul. 25, 2003, pending, the disclosure of which is incorporated by reference. In one embodiment, document concepts 47 are formed from concepts and terms extracted from the documents 14 and the frequencies of occurrences and reference counts of the concepts and terms are determined. Each concept and term is then scored based on frequency, concept weight, structural weight, and corpus weight. The document concept scores 48 are compressed and assigned to normalized score vectors for each of the documents 14. The similarities between each of the normalized score vectors are determined, preferably as cosine values. A set of candidate seed documents is evaluated to select a set of seed documents 49 as initial cluster centers based on relative similarity between the assigned normalized score vectors for each of the candidate seed documents or using a dynamic threshold based on an analysis of the similarities of the documents 14 from a center of each cluster 15, such as described in commonly-assigned U.S. patent application Ser. No. 10/626,984, filed Jul. 25, 2003, pending, the disclosure of which is incorporated by reference. The remaining non-seed documents are evaluated against the cluster centers also based on relative similarity and are grouped into the clusters 50 based on best-fit, subject to a minimum fit criterion.

The theme generator 41 evaluates the document concepts 47 assigned to each of the clusters 50 and identifies cluster concepts 53 for each cluster 50, as further described below with reference to FIG. 4. Briefly, the document concepts 47 for each cluster 50 are ranked into ranked cluster concepts 52 based on cumulative document concept scores 51. The top-ranked document concepts 47 are designated as cluster concepts 53. In the described embodiment, each cluster concept 53 must also be a document concept 47 appearing in the initial cluster center, be contained in a minimum of two documents 14 or at least 30% of the documents 14 in the cluster 50. Other cluster concept membership criteria are possible.

The cluster placement component 42 places spines and certain clusters 50 into a two-dimensional display space as a visualization 43. The cluster placement component 42 performs four principal functions. First, the cluster placement component 42 selects candidate spines 55, as further described below with reference to FIG. 5. Briefly, the candidate spines 55 are selected by surveying the cluster concepts 53 for each cluster 50. Each cluster concept 53 shared by two or more clusters 50 can potentially form a spine of clusters 50. However, those cluster concepts 53 referenced by just a single cluster 50 or by more than 10% of the clusters 50 are discarded. The remaining clusters 50 are identified as candidate spine concepts 54, which each logically form a candidate spine 55.

Second, the cluster placement component 42 assigns each of the clusters 50 to a best fit spine 56, as further described below with reference to FIG. 6. Briefly, the fit of each candidate spine 55 to a cluster 50 is determined by evaluating the candidate spine concept 54 to the cluster concept 53. The candidate spine 545 exhibiting a maximum fit is selected as the best fit spine 56 for the cluster 50.

Third, the cluster placement component 42 selects and places unique seed spines 58, as further described below with reference to FIG. 7. Briefly, spine concept score vectors 57 are generated for each best fit spine 56 and evaluated. Those best fit spines 56 having an adequate number of assigned clusters 50 and which are sufficiently dissimilar to any previously selected best fit spines 56 are designated and placed as seed spines 58.

The cluster placement component 42 places any remaining unplaced best fit spines 56 and clusters 50 that lack best fit spines 56 into spine groups, as further described below with reference to FIG. 8. Briefly, anchor clusters 60 are selected based on similarities between unplaced candidate spines 55 and candidate anchor clusters. Cluster spines are grown by placing the clusters 50 in similarity precedence to previously placed spine clusters or anchor clusters along vectors originating at each anchor cluster 60. As necessary, clusters 50 are placed outward or in a new vector at a different angle from new anchor clusters 55. Finally, the spine groups are placed within the visualization 43 by translating the spine groups until there is no overlap, such as described in commonly-assigned U.S. patent application Ser. No. 10/084,401, filed Feb. 25, 2002, pending, the disclosure of which is incorporated by reference.

Each module or component is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The display generator 32 operates in accordance with a sequence of process steps, as further described below with reference to FIG. 3.

Method Overview

Figure 3:
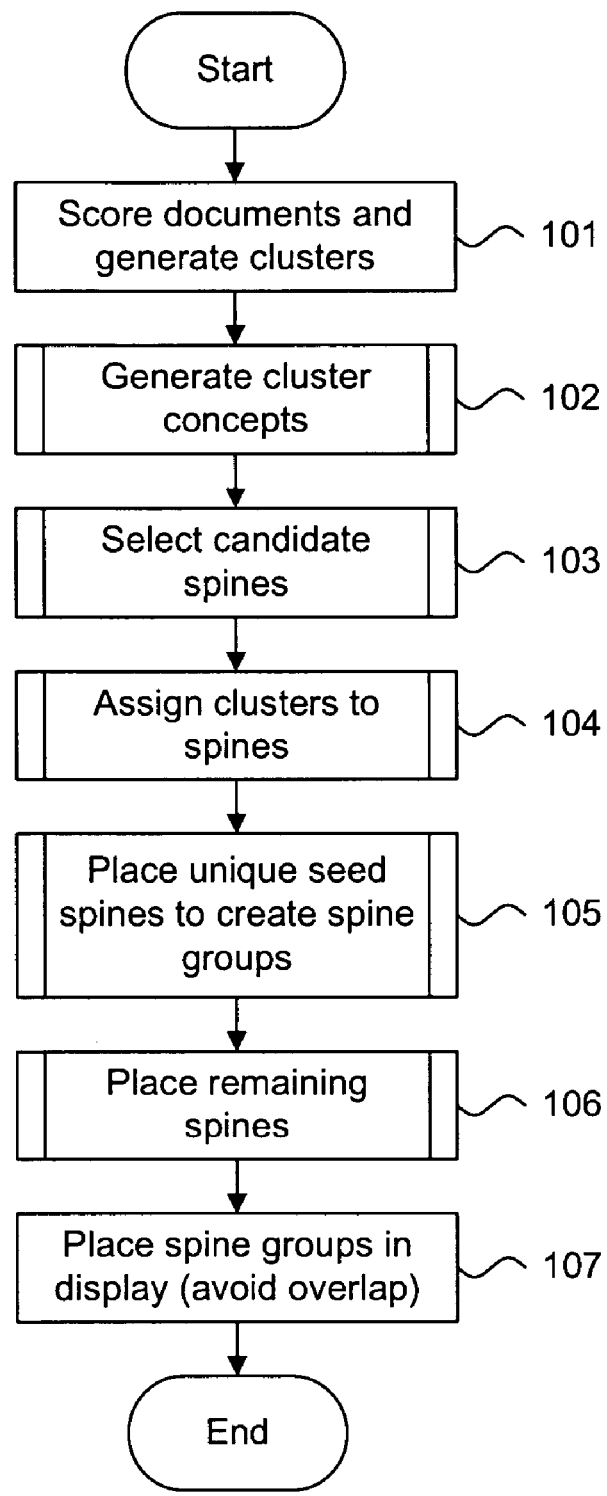
FIG. 3 is a flow diagram showing a method for arranging concept clusters in thematic neighborhood relationships in a shaped two-dimensional visual display space, in accordance with the present invention.

FIG. 3 is a flow diagram showing a method 100 for arranging concept clusters 50 in thematic neighborhood relationships in a two-dimensional visual display space, in accordance with the present invention. The method 80 is described as a sequence of process operations or steps, which can be executed, for instance, by a display generator 32 (shown in FIG. 1).

As an initial step, documents 14 are scored and clusters 50 are generated (block 101), such as described in commonly-assigned U.S. patent application Ser. No. 10/626,984, filed Jul. 25, 2003, pending, the disclosure of which is incorporated by reference. Next, one or more cluster concepts 53 are generated for each cluster 50 based on cumulative cluster concept scores 51 (block 102), as further described below with reference to FIG. 4. The cluster concepts 53 are used to select candidate spines 55 (block 103), as further described below with reference to FIG. 5, and the clusters 50 are then assigned to the candidate spines 55 as best fit spines 56 (block 104), as further described below with reference to FIG. 6. Unique seed spines are identified from the best fit spines 56 and placed to create spine groups (block 105), as further described below with reference to FIG. 7. Any remaining unplaced best fit spines 56 and clusters 50 that lack best fit spines 56 are also identified and placed (block 106), as further described below with reference to FIG. 8. Finally, the spine groups are placed within the visualization 43 in the display space. In the described embodiment, each of the spine groups is placed so as to avoid overlap with other spine groups. In a further embodiment, the spine groups can be placed by similarity to other spine groups. Other cluster, spine, and spine group placement methodologies could also be applied based on similarity, dissimilarity, attraction, repulsion, and other properties in various combinations, as would be appreciated by one skilled in the art. The method then terminates.

Cluster Concept Generation

Figure 4:
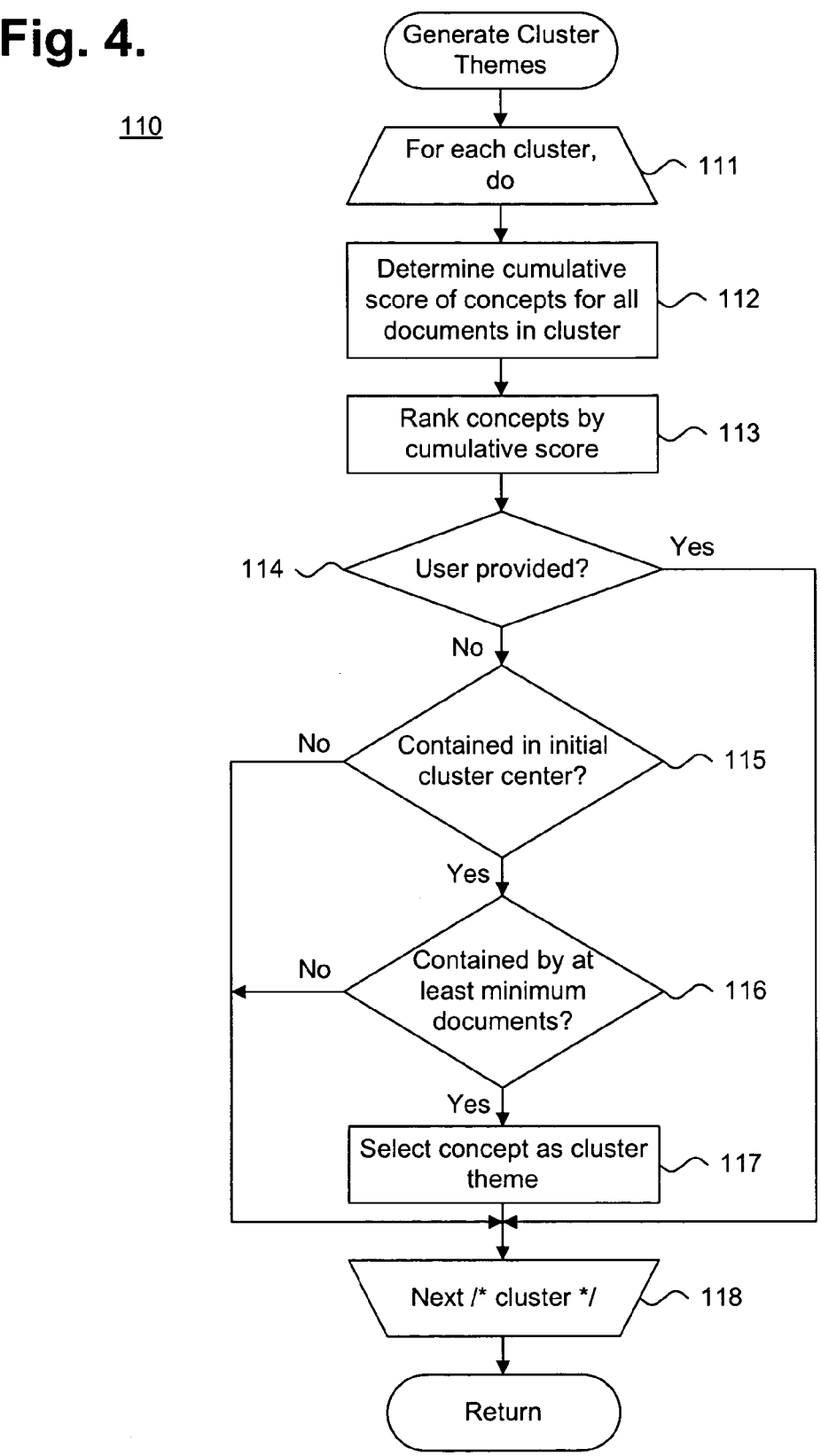
FIG. 4 is a flow diagram showing the routine for generating cluster concepts for use in the method of FIG. 3.

FIG. 4 is a flow diagram showing the routine 110 for generating cluster concepts 53 for use in the method 100 of FIG. 3. One purpose of this routine is to identify the top ranked cluster concepts 53 that best summarizes the commonality of the documents in any given cluster 50 based on cumulative document concept scores 51.

A cluster concept 53 is identified by iteratively processing through each of the clusters 50 (blocks 111-118). During each iteration, the cumulative score 51 of each of the document concepts 47 for all of the documents 14 appearing in a cluster 50 are determined (block 112). The cumulative score 51 can be calculated by summing over the document concept scores 48 for each cluster 50. The document concepts 47 are then ranked by cumulative score 51 as ranked cluster concepts 52 (block 113). In the described embodiment, the ranked cluster concepts 52 appear in descending order, but could alternatively be in ascending order. Next, a cluster concept 53 is determined. The cluster concept 53 can be user provided (block 114). Alternatively, each ranked cluster concept 52 can be evaluated against an acceptance criteria (blocks 115 and 116) to select a cluster concept 53. In the described embodiment, cluster concepts 53 must meet the following criteria:

(1) be contained in the initial cluster center (block 115); and (2) be contained in a minimum of two documents 14 or 30% of the documents 14 in the cluster 50, whichever is greater (block 116).

The first criteria restricts acceptable ranked cluster concepts 52 to only those document concepts 47 that appear in a seed cluster center theme of a cluster 50 and, by implication, are sufficiently relevant based on their score vectors. Generally, a cluster seed theme corresponds to the set of concepts appearing in a seed document 49, but a cluster seed theme can also be specified by a user or by using a dynamic threshold based on an analysis of the similarities of the documents 14 from a center of each cluster 50, such as described in commonly-assigned U.S. patent application Ser. No. 10/626,984, filed Jul. 25, 2003, pending, the disclosure of which is incorporated by reference The second criteria filters out those document concepts 47 that are highly scored, yet not popular. Other criteria and thresholds for determining acceptable ranked cluster concepts 52 are possible.

If acceptable (blocks 115 and 116), the ranked cluster concept 52 is selected as a cluster concept 53 (block 117) and processing continues with the next cluster (block 118), after which the routine returns.

Candidate Spine Selection

Figure 5:
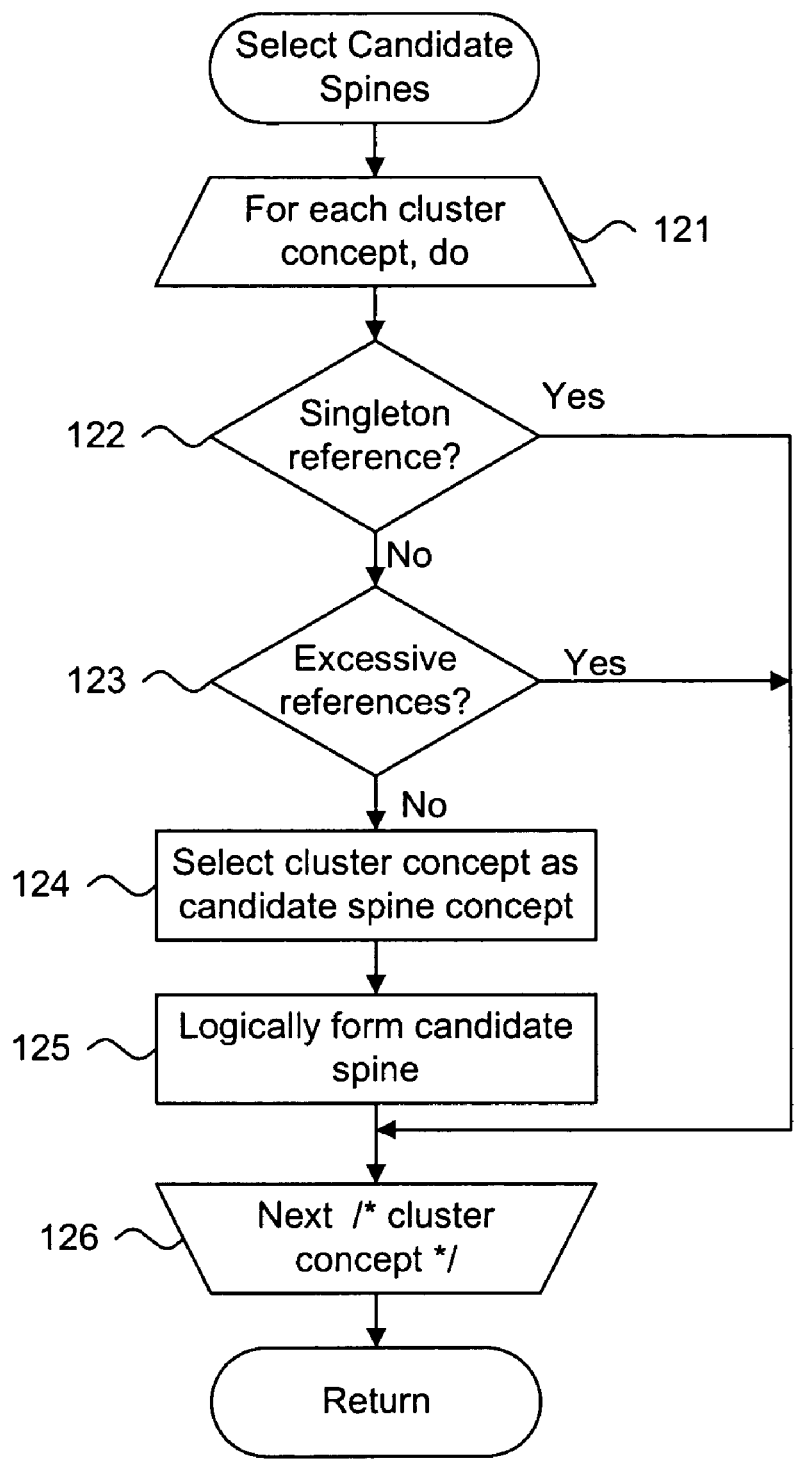
FIG. 5 is a flow diagram showing the routine for selecting candidate spines for use in the method of FIG. 3.

FIG. 5 is a flow diagram showing the routine 120 for selecting candidate spines 55 for use in the method 100 of FIG. 3. One purpose of this routine is to identify candidate spines 55 from the set of all potential spines 55.

Each cluster concept 53 shared by two or more clusters 50 can potentially form a spine of clusters 50. Thus, each cluster concept 53 is iteratively processed (blocks 121-126). During each iteration, each potential spine is evaluated against an acceptance criteria (blocks 122-123). In the described embodiment, a potential spine cannot be referenced by only a single cluster 50 (block 122) or by more than 10% of the clusters 50 in the potential spine (block 123). Other criteria and thresholds for determining acceptable cluster concepts 53 are possible. If acceptable (blocks 122, 123), the cluster concept 53 is selected as a candidate spine concept 54 (block 124) and a candidate spine 55 is logically formed (block 125). Processing continues with the next cluster (block 126), after which the routine returns.

Cluster to Spine Assignment

Figure 6:
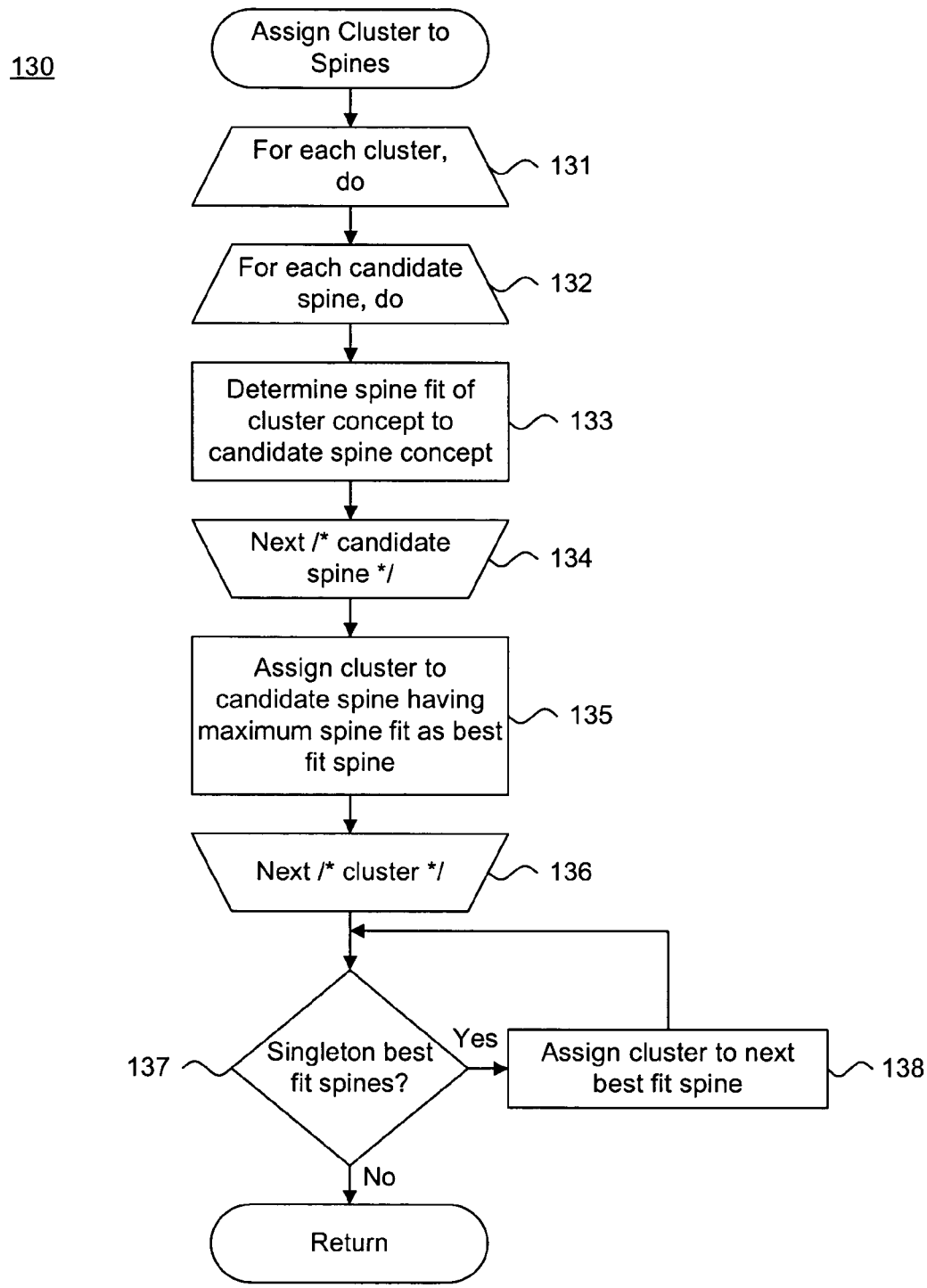
FIG. 6 is a flow diagram showing the routine for assigning clusters to candidate spines for use in the method of FIG. 3.

FIG. 6 is a flow diagram showing the routine 130 for assigning clusters 50 to candidate spines 55 for use in the method 100 of FIG. 3. One purpose of this routine is to match each cluster 50 to a candidate spine 55 as a best fit spine 56.

The best fit spines 56 are evaluated by iteratively processing through each cluster 50 and candidate spine 55 (blocks 131-136 and 132-134, respectively). During each iteration for a given cluster 50 (block 131), the spine fit of a cluster concept 53 to a candidate spine concept 54 is determined (block 133) for a given candidate spine 55 (block 132). In the described embodiment, the spine fit F is calculated according to the following equation:

$$F = \log\left(\frac{\text{popularity}}{\text{rank}^2}\right) \times \text{scale}$$

where popularity is defined as the number of clusters 50 containing the candidate spine concept 54 as a cluster concept 53, rank is defined as the rank of the candidate spine concept 54 for the cluster 50, and scale is defined as a bias factor for favoring a user specified concept or other predefined or dynamically specified characteristic. In the described embodiment, a scale of 1.0 is used for candidate spine concept 54 while a scale of 5.0 is used for user specified concepts. Processing continues with the next candidate spine 55 (block 134). Next, the cluster 50 is assigned to the candidate spine 55 having a maximum spine fit as a best fit spine 56 (block 135). Processing continues with the next cluster 50 (block 136). Finally, any best fit spine 56 that attracts only a single cluster 50 is discarded (block 137) by assigning the cluster 50 to a next best fit spine 56 (block 138). The routine returns.

Generate Unique Spine Group Seeds

Figure 7:
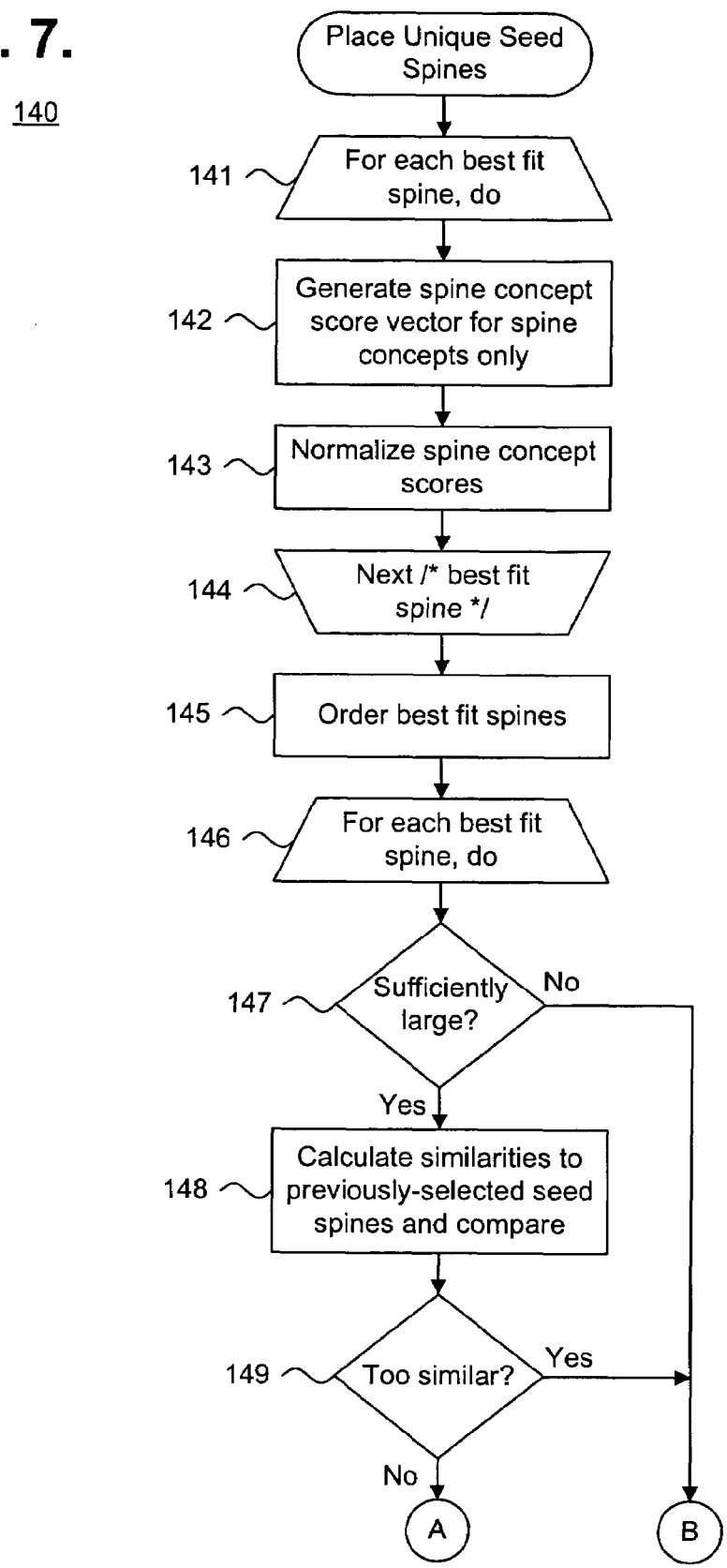
FIG. 7 is a flow diagram showing the routine for placing unique seed spines for use in the method of FIG. 3.
Figure 7:
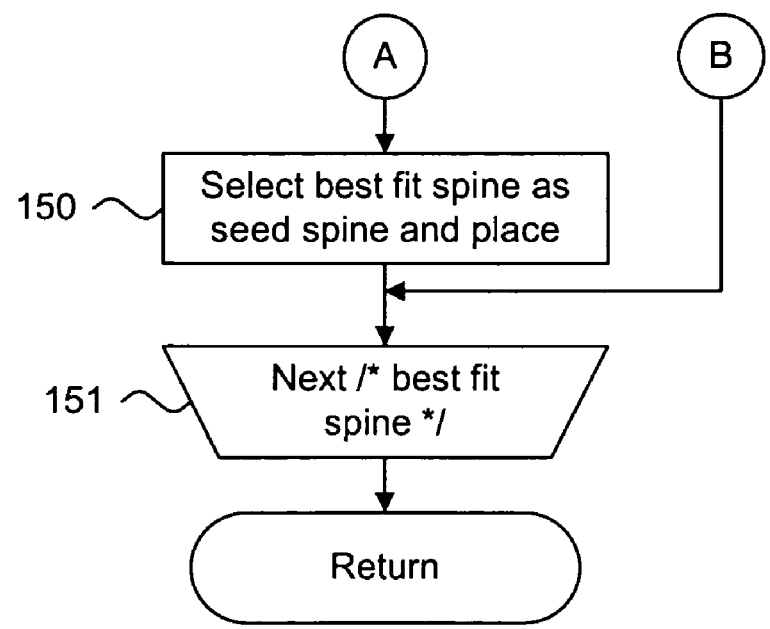

FIG. 7 is a flow diagram showing the routine 140 for placing unique seed spines for use in the method 100 of FIG. 3. One purpose of this routine identify and place best fit spines 56 into the visualization 43 as unique seed spines 58 for use as anchors for subsequent candidate spines 55.

Candidate unique seed spines are selected by first iteratively processing through each best fit spine 56 (blocks 141-144). During each iteration, a spine concept score vector 57 is generated for only those spine concepts corresponding to each best fit spine 56 (block 142). The spine concept score vector 57 aggregates the cumulative cluster concept scores 51 for each of the clusters 50 in the best fit spine 56. Each spine concept score in the spine concept score vector 57 is normalized, such as by dividing the spine concept score by the length of the spine concept score vector 57 (block 143). Processing continues for each remaining best fit spine 56 (block 144), after which the best fit spines 56 are ordered by number of clusters 50. Each best fit spine 56 is again iteratively processed (blocks 146-151). During each iteration, best fit spines 56 that are not sufficiently large are discarded (block 147). In the described embodiment, a sufficiently large best fit spine 56 contains at least five clusters 50. Next, the similarities of the best fit spine 56 to each previously-selected unique seed spine 58 is calculated and compared (block 148). In the described embodiment, best fit spine similarity is calculated as the cosine of the spine concept score vectors 59, which contains the cumulative cluster concept scores 51 for the cluster concepts 53 of each cluster 50 in the best fit spine 56 or previously-selected unique seed spine 58. Best fit spines 56 that are not sufficiently dissimilar are discarded (block 14). Otherwise, the best fit spine 56 is identified as a unique seed spine 58 and is placed in the visualization 43 (block 150). Processing continues with the next best fit spine 56 (block 151), after which the routine returns.

Remaining Spine Placement

Figure 8:
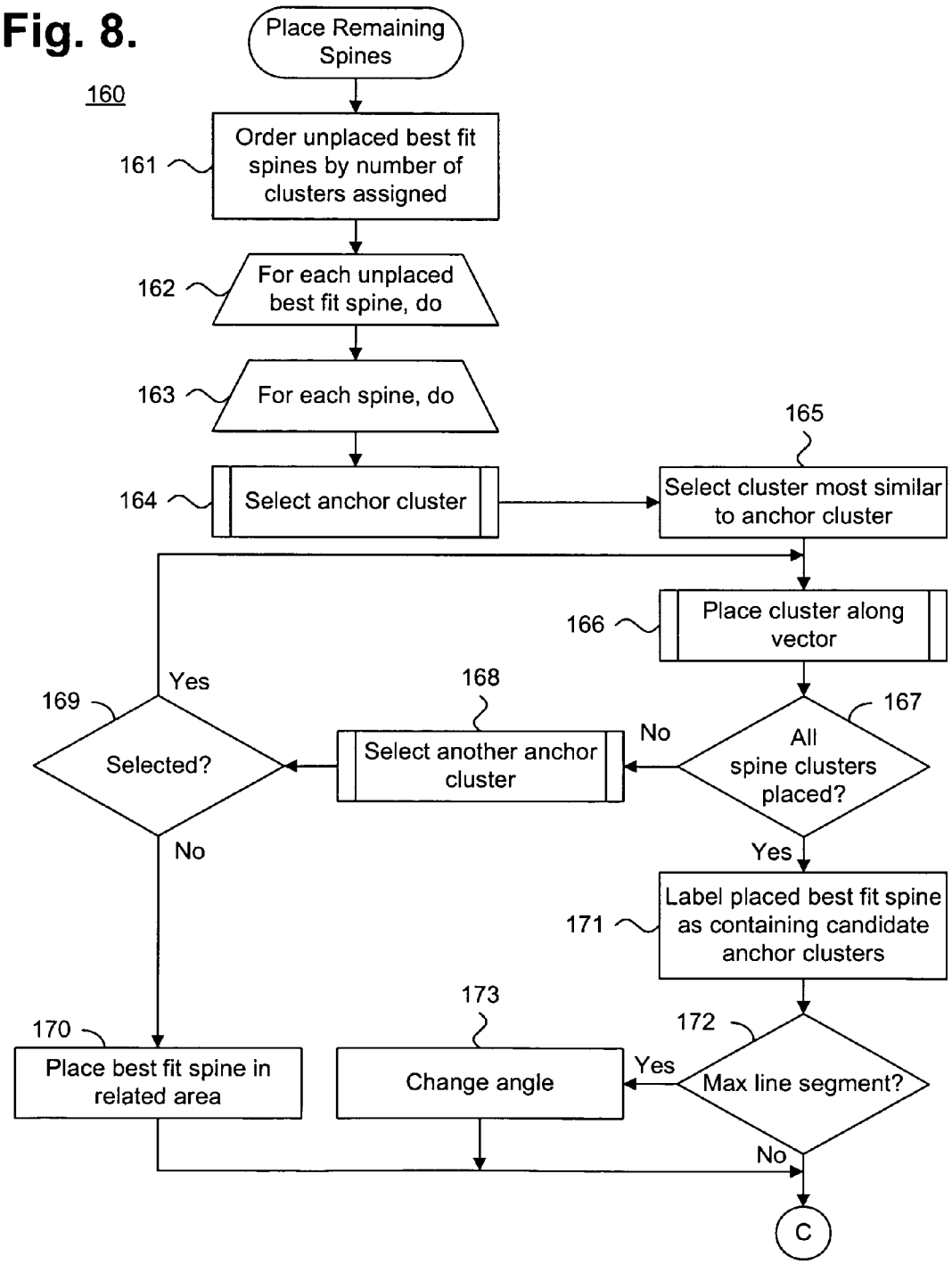
FIG. 8 is a flow diagram showing the routine for placing remaining best fit spines for use in the method of FIG. 3.
Figure 8:
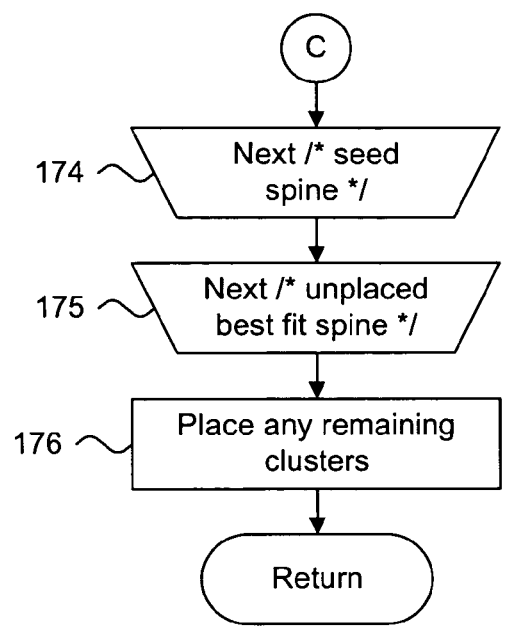

FIG. 8 is a flow diagram showing the routine 160 for placing remaining candidate spines 55 for use in the method 100 of FIG. 3. One purpose of this routine identify and place any remaining unplaced best fit spines 56 and clusters 50 that lack best fit spines 56 into the visualization 43.

First, any remaining unplaced best fit spines 56 are ordered by number of clusters 50 assigned (block 161). The unplaced best fit spine 56 are iteratively processed (blocks 162-175) against each of the previously-placed spines (blocks 163-174). During each iteration, an anchor cluster 60 is selected from the previously placed spine 58 (block 164), as further described below with reference to FIG. 9. The cluster 50 contained in the best fit spine 56 that is most similar to the selected anchor cluster 60 is then selected (block 165). In the described embodiment, cluster similarity is calculated as cosine value of the cumulative cluster concept vectors 51, although other determinations of cluster similarity are possible, including minimum, maximum, and median similarity bounds. The spine clusters 50 are grafted onto the previously placed spine along a vector defined from the center of the anchor cluster 55 (block 166), as further described below with reference to FIG. 12. If any of the spine clusters are not placed (block 167), another anchor cluster 60 is selected (block 168), as further described below with reference to FIG. 9. Assuming another anchor cluster 60 is selected (block 169), the spine clusters are again placed (block 166), as further described below with reference to FIG. 12. Otherwise, if another anchor cluster 60 is not selected (block 169), the cluster 50 is placed in a related area (block 170). In one embodiment, unanchored best fit spines 56 become additional spine group seeds. In a further embodiment, unanchored best fit spines 56 can be placed adjacent to the best fit anchor cluster 60 or in a display area of the visualization 43 separately from the placed best fit spines 56.

If the cluster 50 is placed (block 167), the best fit spine 56 is labeled as containing candidate anchor clusters 60 (block 171). If the current vector forms a maximum line segment (block 172), the angle of the vector is changed (block 173). In the described embodiment, a maximum line segment contains more than 25 clusters 50, although any other limit could also be applied. Processing continues with each seed spine (block 174) and remaining unplaced best fit spine 56 (block 175). Finally, any remaining unplaced clusters 50 are placed (block 176). In one embodiment, unplaced clusters 50 can be placed adjacent to a best fit anchor cluster 60 or in a display area of the visualization 43 separately from the placed best fit spines 56. The routine then returns.

Anchor Cluster Selection

Figure 9:
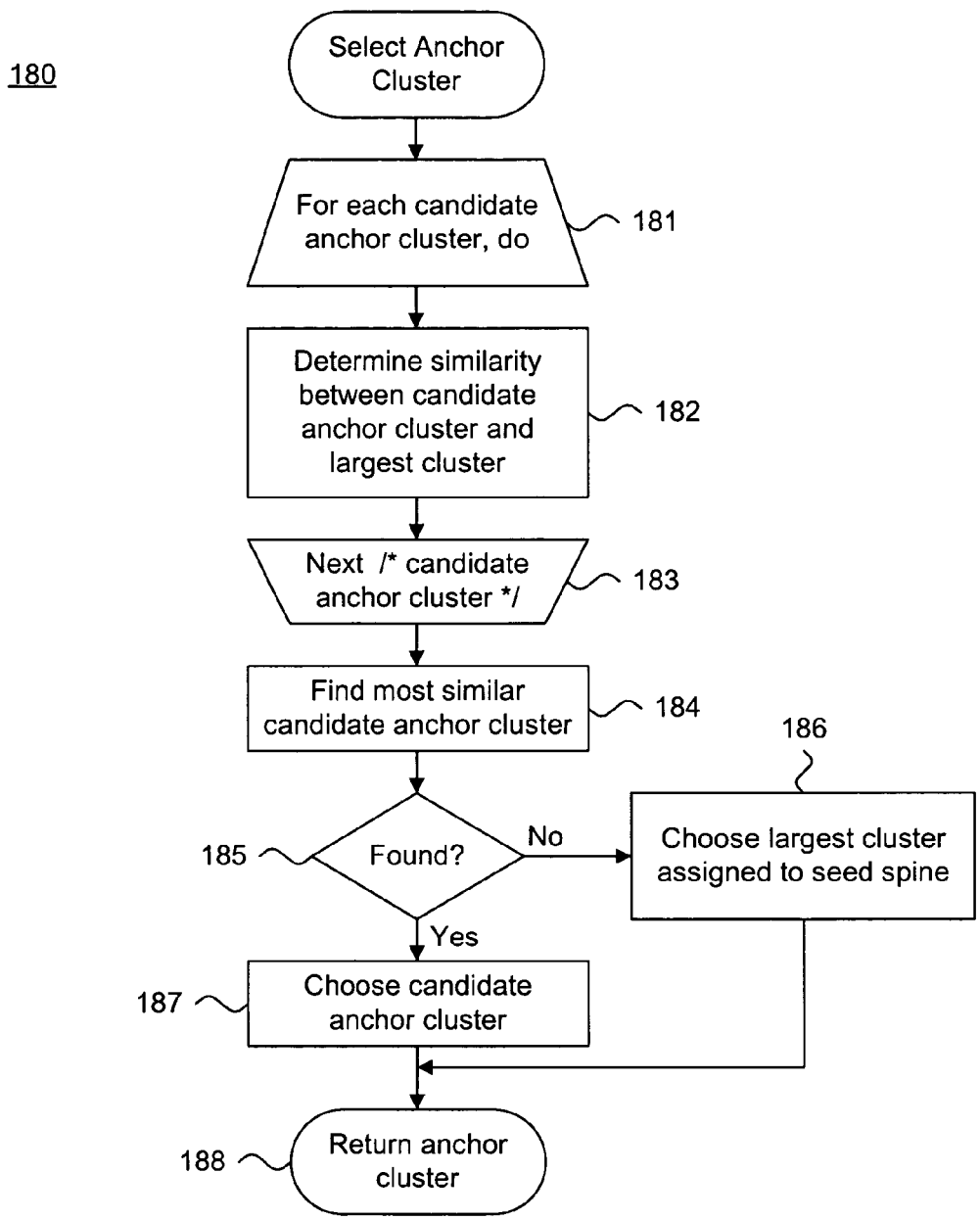
FIG. 9 is a flow diagram showing the function for selecting an anchor cluster for use in the routine of FIG. 8.

FIG. 9 is a flow diagram showing the function 180 for selecting an anchor cluster 60 for use in the routine 160 of FIG. 8. One purpose of this routine is to return a set of anchor clusters 60, which contain the spine concept and which are ordered by similarity to the largest cluster 50 in the spine.

Each candidate anchor cluster 60 is iteratively processed (blocks 181-183) to determine the similarity between a given cluster 50 and each candidate anchor cluster 60 (block 182). In one embodiment, each cluster similarity is calculated as cosine value concept vectors, although other determinations of cluster similarity are possible, including minimum, maximum, and median similarity bounds. The most similar candidate anchor cluster 60 is identified (block 184) and, if found, chosen as the anchor cluster 60 (block 187), such as described in commonly-assigned U.S. patent application Ser. No. 10/084,401, filed Feb. 25, 2002, pending, the disclosure of which is incorporated by reference. Otherwise, if not found (block 185), the largest cluster 50 assigned to the unique seed spine 58 is chosen as the anchor cluster 60 (block 186). The function then returns set of the anchor clusters 60 and the unique seed spine 58 becomes a seed for a new spine group (block 188).

Cluster Spine Example

Figure 10:
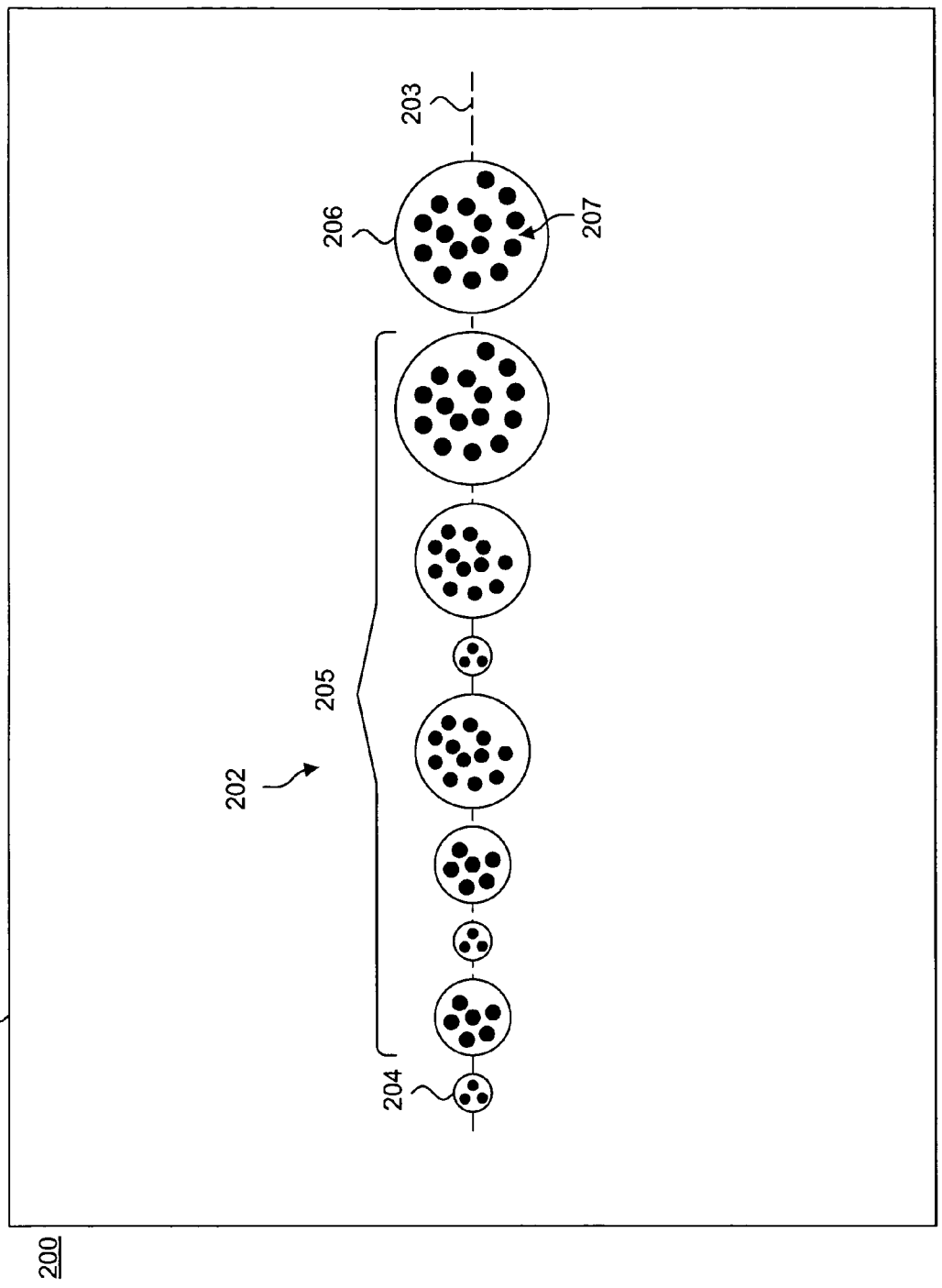
FIG. 10 is a data representation diagram showing, by way of example, a view of a cluster spine.

FIG. 10 is a data representation diagram 200 showing, by way of example, a view of a cluster spine 202. Clusters are placed in a cluster spine 202 along a vector 203, preferably defined from center of an anchor cluster. Each cluster in the cluster spine 202, such as endpoint clusters 204 and 206 and midpoint clusters 205, group documents 207 sharing a popular concept, that is, assigned to a best-fit concept 53. The cluster spine 202 is placed into a visual display area 201 to generate a two-dimensional spatial arrangement. To represent data inter-relatedness, the clusters 204-206 in each cluster spine 202 are placed along a vector 203 arranged in order of cluster similarity, although other line shapes and cluster orderings can be used.

The cluster spine 202 visually associates those clusters 204-206 sharing a common popular concept. A theme combines two or more concepts. During cluster spine creation, those clusters 204-206 having available anchor points are identified for use in grafting other cluster spines sharing popular thematically-related concepts, as further described below with reference to FIGS. 11A-C.

Anchor Points Example

Figure 11A:
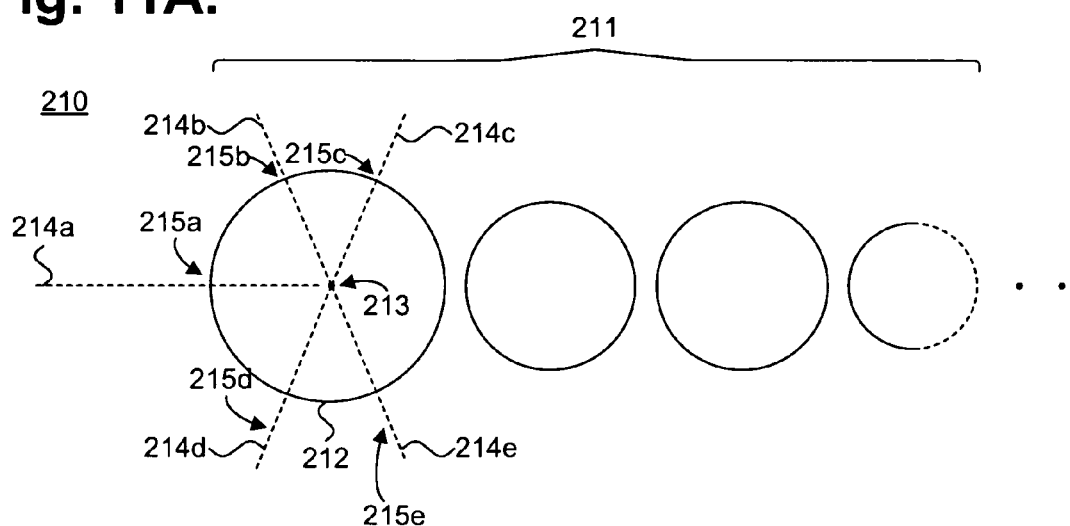
FIGS. 11A-C are data representation diagrams showing anchor points within cluster spines.
Figure 11B:
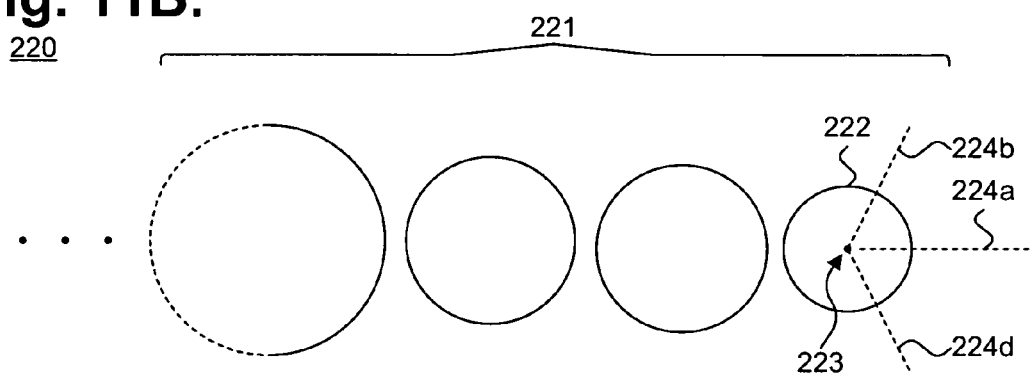
Figure 11C:
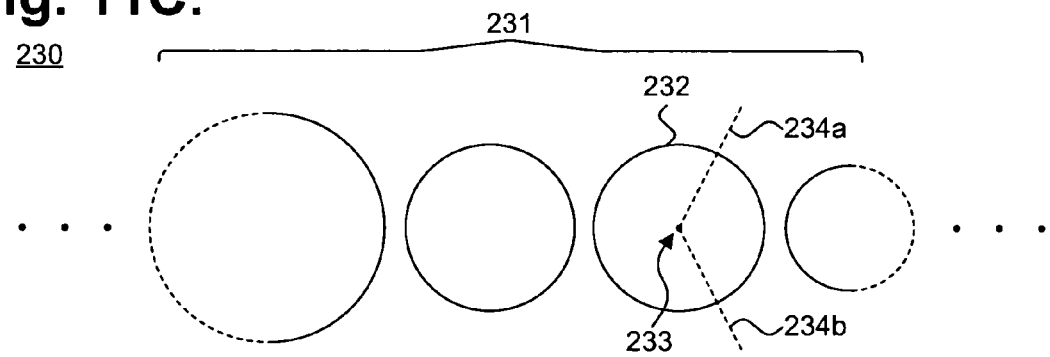

FIGS. 11A-C are data representation diagrams 210, 220, 230 showing anchor points within cluster spines. A placed cluster having at least one open edge constitutes a candidate anchor point 54. Referring first to FIG. 11A, a starting endpoint cluster 212 of a cluster spine 211 functions as an anchor point along each open edge 215*a-e* at primary and secondary angles.

An open edge is a point along the edge of a cluster at which another cluster can be adjacently placed. In the described embodiment, clusters are placed with a slight gap between each cluster to avoid overlapping clusters. Otherwise, a slight overlap within 10% with other clusters is allowed. An open edge is formed by projecting vectors 214*a-e* outward from the center 213 of the endpoint cluster 212, preferably at normalized angles. The clusters in the cluster spine 211 are arranged in order of cluster similarity.

In one embodiment, given $0 \leq \sigma < \Pi$, where $\sigma$ is the angle of the current cluster spine 211, the normalized angles for largest endpoint clusters are at one third $\Pi$ to minimize interference with other spines while maximizing the degree of inter-relatedness between spines. If the cluster ordinal spine position is even, the primary angle is $$\sigma + \frac{\Pi}{3}$$

and the secondary angle is $$\sigma - \frac{\Pi}{3}.$$

Otherwise, the primary angle is $$\sigma - \frac{\Pi}{3}$$

and the secondary angle is $$\sigma + \frac{\Pi}{3}.$$

Other evenly divisible angles could be also used.

Referring next to FIG. 11B, the last endpoint cluster 222 of a cluster spine 221 also functions as an anchor point along each open edge. The endpoint cluster 222 contains the fewest number of concepts. The clusters in the cluster spine 221 are arranged in order of similarity to the last placed cluster. An open edge is formed by projecting vectors 224*a-c* outward from the center 223 of the endpoint cluster 222, preferably at normalized angles.

In one embodiment, given $0 \leq \sigma < \Pi$, where $\sigma$ is the angle of the current cluster spine 221, the normalized angles for smallest endpoint clusters are at one third $\Pi$, but only three open edges are available to graft other thematically-related cluster spines. If the cluster ordinal spine position is even, the primary angle is $$\sigma + \frac{\Pi}{3}$$

and the secondary angle is $$\sigma - \frac{\Pi}{3}.$$

Otherwise, the primary angle is $$\sigma - \frac{\Pi}{3}$$

and the secondary angle is $$\sigma + \frac{\Pi}{3}.$$

Other evenly divisible angles could be also used.

Referring finally to FIG. 11C, a midpoint cluster 237 of a cluster spine 231 functions as an anchor point for a cluster spine 236 along each open edge. The midpoint cluster 237 is located intermediate to the clusters in the cluster spine 236 and defines an anchor point along each open edge. An open edge is formed by projecting vectors 239a-b outward from the center 238 of the midpoint cluster 237, preferably at normalized angles. Unlike endpoint clusters 52, 232 the midpoint cluster 237 can only serve as an anchor point along tangential vectors non-coincident to the vector forming the cluster spine 236. Accordingly, endpoint clusters 212, 222 include one additional open edge serving as a coincident anchor point.

In one embodiment, given $0 \leq \sigma < \Pi$, where $\sigma$ is the angle of the current cluster spine 231, the normalized angles for midpoint clusters are at one third $\Pi$, but only two open edges are available to graft other thematically-related cluster spines. Empirically, limiting the number of available open edges to those facing the direction of cluster similarity helps to maximize the interrelatedness of the overall display space.

Grafting a Spine Cluster Onto a Spine

Figure 12:
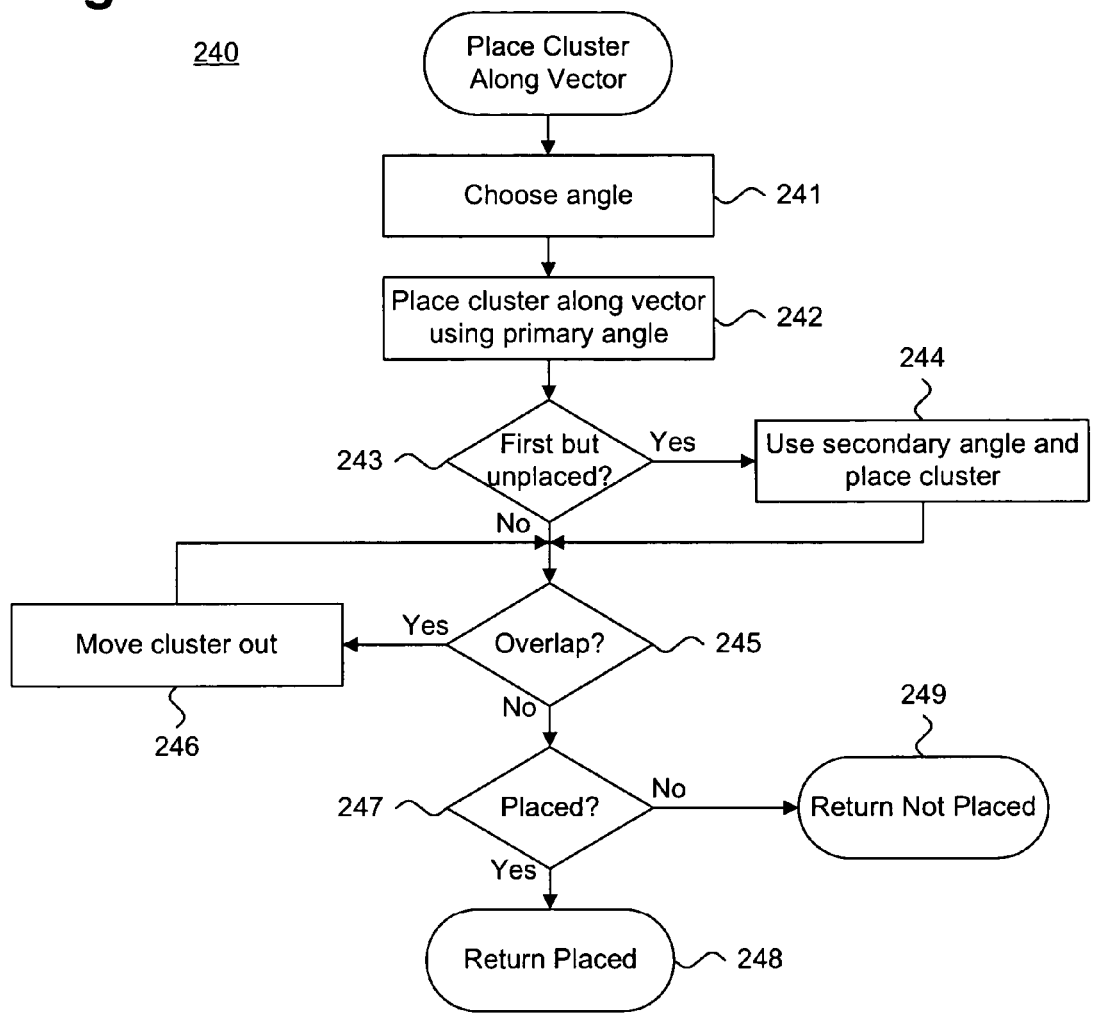
FIG. 12 is a flow diagram showing the function for grafting a spine cluster onto a spine for use in the routine of FIG. 8.

FIG. 12 is a flow diagram showing the function 240 for grafting a spine cluster 50 onto a spine for use in the routine 160 of FIG. 8. One purpose of this routine is to attempt to place a cluster 50 at an anchor point in a cluster spine either along or near an existing vector, if possible, as further described below with reference to FIG. 13.

An angle for placing the cluster 50 is determined (block 241), dependent upon whether the cluster against which the current cluster 50 is being placed is a starting endpoint, midpoint, or last endpoint cluster, as described above with reference to FIGS. 11A-C. If the cluster ordinal spine position is even, the primary angle is $$\sigma + \frac{\Pi}{3}$$

and the secondary angle is $$\sigma - \frac{\Pi}{3}.$$

Otherwise, the primary angle is $$\sigma - \frac{\Pi}{3}$$

and the secondary angle is $$\sigma + \frac{\Pi}{3}.$$

Other evenly divisible angles could be also used. The cluster 50 is then placed using the primary angle (block 242). If the cluster 50 is the first cluster in a cluster spine but cannot be placed using the primary angle (block 243), the secondary angle is used and the cluster 50 is placed (block 244). Otherwise, if the cluster 50 is placed but overlaps more than 10% with existing clusters (block 245), the cluster 50 is moved outward (block 246) by the diameter of the cluster 50. Finally, if the cluster 50 is satisfactorily placed (block 247), the function returns an indication that the cluster 50 was placed (block 248). Otherwise, the function returns an indication that the cluster was not placed (block 249).

Cluster Placement Relative to an Anchor Point Example

Figure 13:
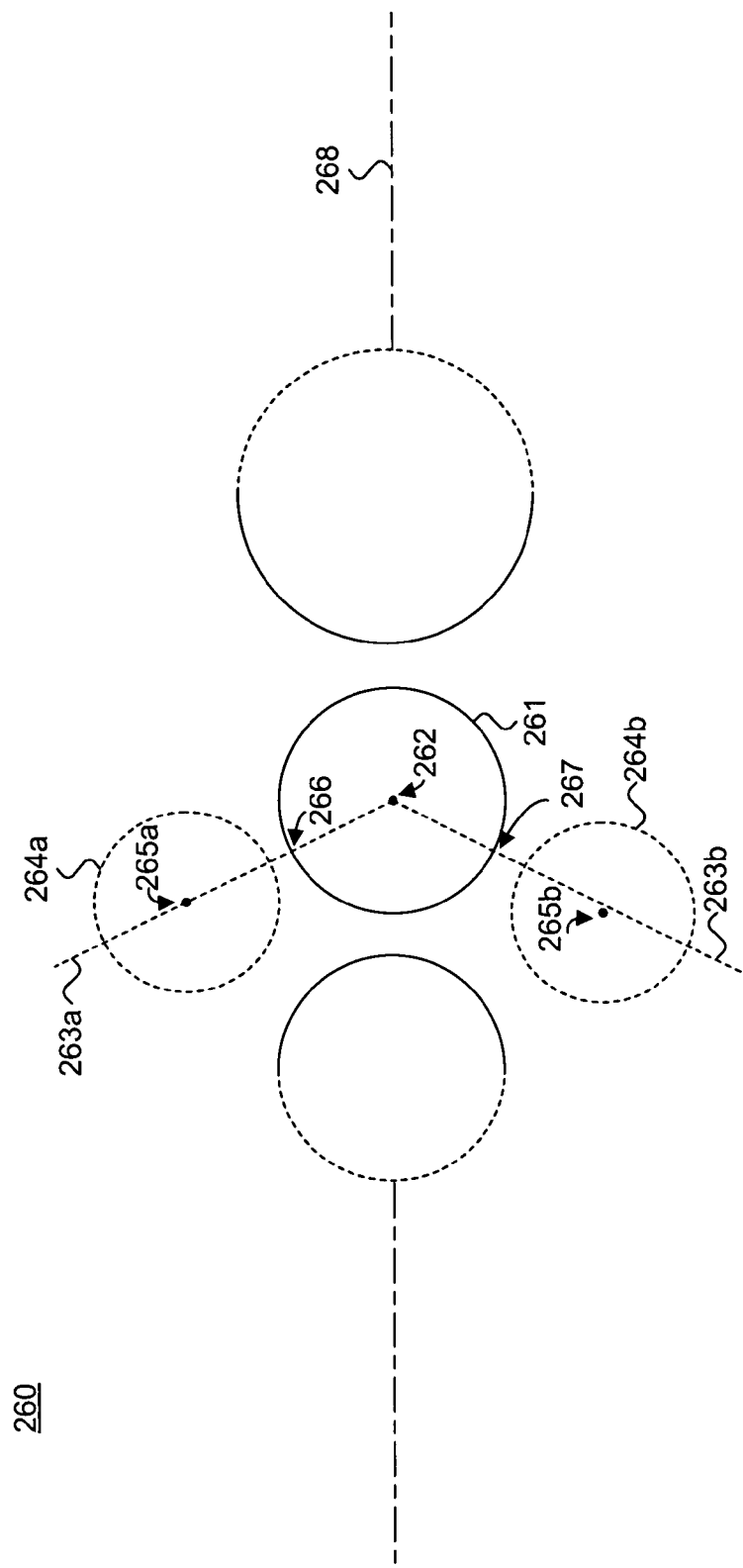
FIG. 13 is a data representation diagram showing, by way of example, cluster placement relative to an anchor point.

FIG. 13 is a data representation diagram showing, by way of example, cluster placement relative to an anchor point. Anchor points 266, 267 are formed along an open edge at the intersection of a vector 263a, 263b, respectively, drawn from the center 262 of the cluster 261. The vectors are preferably drawn at a normalized angle, such as $$\frac{\Pi}{3}$$

in one embodiment, relative to the vector 268 forming the cluster spine 268.

Completed Cluster Placement Example

Figure 14:
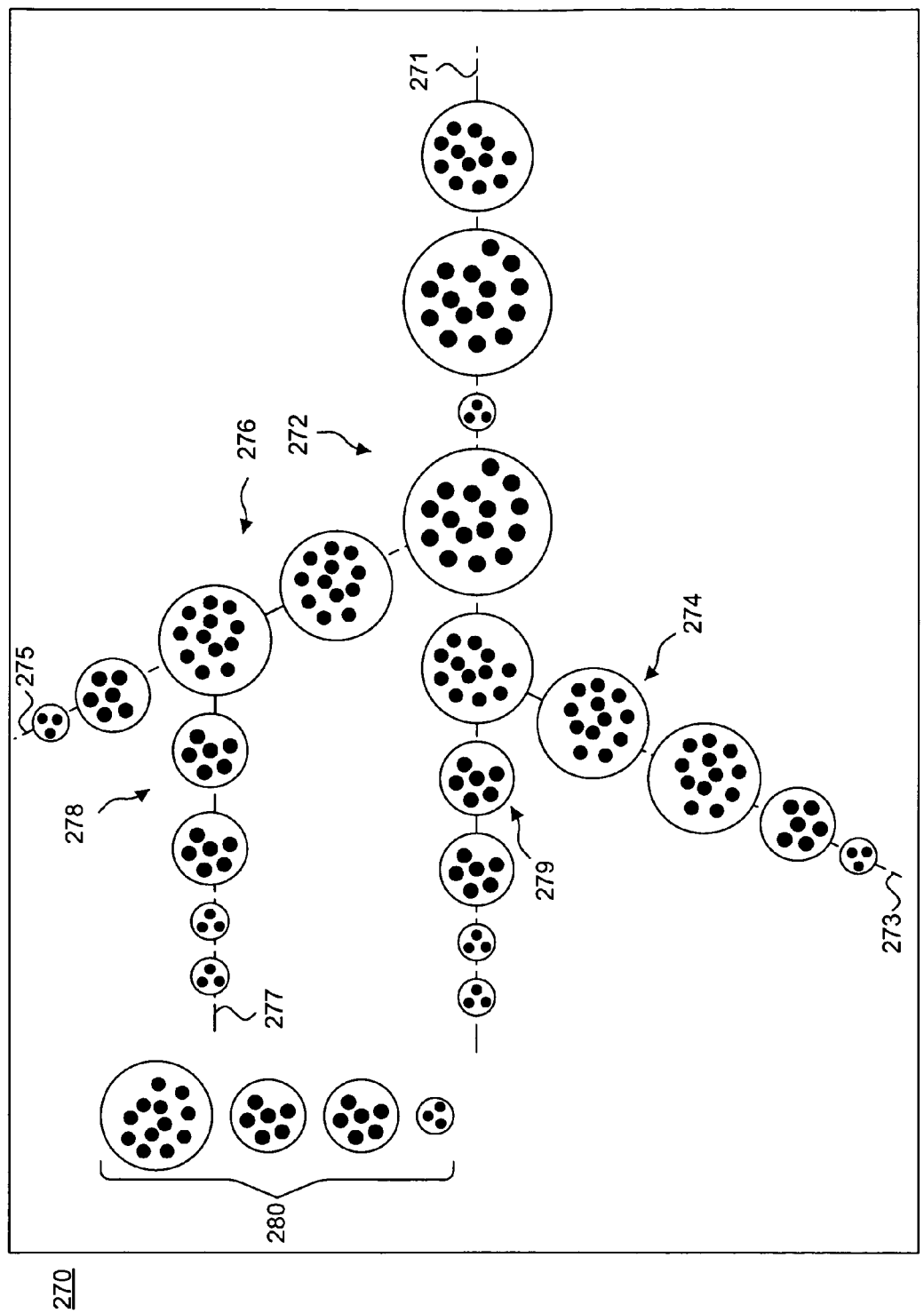
FIG. 14 is a data representation diagram showing, by way of example, a completed cluster placement.

FIG. 14 is a data representation diagram 270 showing, by way of example, a completed cluster placement. The clusters 272, 274, 276, 278 placed in each of the cluster spines 271, 273, 275, 277 are respectively matched to popular concepts, that is, best-fit concepts 53. Slight overlap 279 between grafted clusters is allowed. In one embodiment, no more than 10% of a cluster can be covered by overlap. The singleton clusters 280, however, do not thematically relate to the placed clusters 272, 274, 276, 278 in cluster spines 271, 273, 275, 277 and are therefore grouped as individual clusters in non-relational placements.

Display Generator

Figure 15:
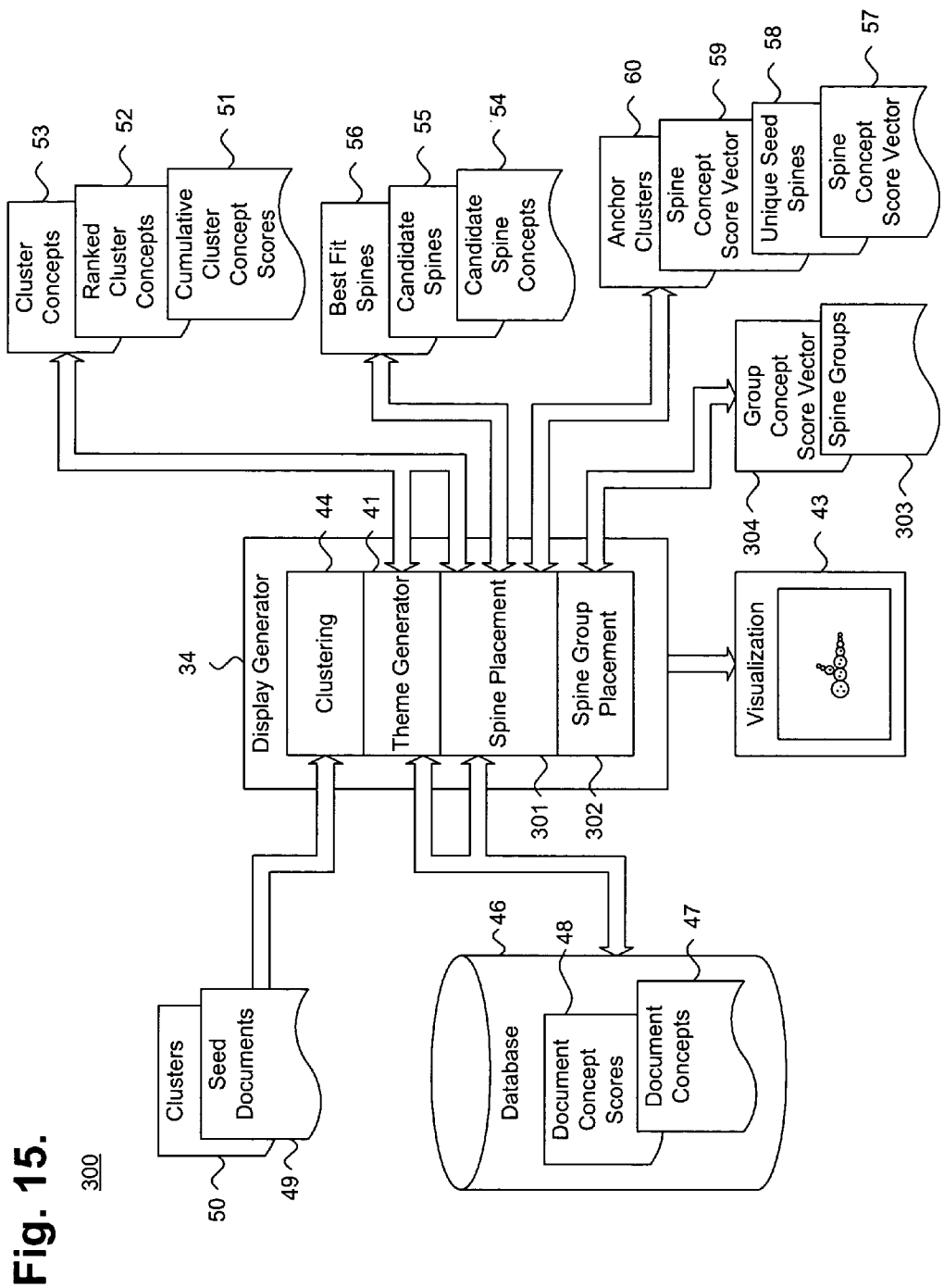
FIG. 15 is a block diagram showing the system modules implementing the display generator of FIG. 1, in accordance with a further embodiment.

FIG. 15 is a block diagram 300 showing the system modules implementing the display generator 34 of FIG. 1, in accordance with a further embodiment. The display generator 34 includes the clustering 44 and theme generator 41 components and maintains the attached storage 44 and the database 46, as further described above with reference to FIG. 2. In addition, the display generator 34 includes spine placement 301 and spine group placement 302 components that respectively place best fit cluster spines 56 and singleton clusters 50 into spine groups 303 and places the spine groups 303 into a two-dimensional display space as a visualization 43.

Briefly, the cluster placement component 301 performs five principal functions. First, the cluster placement component 42 selects candidate spines 55, as further described above with reference to FIG. 5. Briefly, the candidate spines 55 are selected by surveying the cluster concepts 53 for each cluster 50. Each cluster concept 53 shared by two or more clusters 50 can potentially form a spine of clusters 50. However, those cluster concepts 53 referenced by just a single cluster 50 or by more than 10% of the clusters 50 are discarded. The remaining clusters 50 are identified as candidate spine concepts 54, which each logically form a candidate spine 55.

Second, the cluster placement component 42 assigns each of the clusters 50 to a best fit spine 56, as further described above with reference to FIG. 6. Briefly, the fit of each candidate spine 55 to a cluster 50 is determined by evaluating the candidate spine concept 54 to the cluster concept 53. The candidate spine 545 exhibiting a maximum fit is selected as the best fit spine 56 for the cluster 50.

Third, the cluster placement component 42 selects and places unique seed spines 58, as further described above with reference to FIG. 7. Briefly, the best fit spines 56 are first ordered based on spine length using, for instance, the number of clusters 50 contained in the spine. Thus, longer best fit spines are selected first. Spine concept score vectors 57 are then generated for each best fit spine 56 and evaluated. Those best fit spines 56 having an adequate number of assigned clusters 50 and which are sufficiently dissimilar to any previously selected best fit spines 56 are designated and placed as seed spines 58.

Fourth, the cluster placement component 42 places any remaining unplaced best fit spines 56 are placed into spine groups 303, as further described below with reference to FIG. 17. Briefly, a list of anchor cluster candidates 60 is built by identifying those placed best fit spines 56 that contain a potential anchor cluster containing the theme of the unplaced best fit spine 56, have at least one open edge for grafting a spine, and which have at least a minimum similarity. In the described embodiment, spine similarity is determined by evaluating the cosine values of group concept score vectors 304 for the unplaced and placed best fit spines 56 and a minimum similarity of 0.10 is required, although other similarity values are possible. Spine groups 303 are formed by placing the unplaced best fit spines 56 at an anchor cluster 60 on the previously placed best fit spine 56 having the most similarity along a vector originating at the anchor cluster 60. As necessary, best fit spines 56 are placed outward or in a new vector at a different angle from new anchor clusters 60.

Finally, any remaining singleton clusters 50 are placed into spine groups 303, as further described below with reference to FIG. 18. Briefly, a list of candidate anchor clusters 60 is built by identifying those placed best fit spines 56 that have at least one open edge for grafting a spine. Placement is based on a weaker connection and is represented by the proximity of the singleton cluster 50 to a placed best fit spine 56, as further described below with reference to FIG. 19. Thus, if possible, the remaining singleton clusters 50 are placed near an anchor cluster 60 having the most similarity.

The cluster spine placement component 302 places the spine groups 303 within the visualization 43, as further described below with reference to FIG. 20. Briefly, the spine groups 303 are arranged circumferentially to a central shape defined logically within the visualization 43. In the described embodiment, a circle is defined within the visualization 43 and the spine groups 303 are placed radially within equally-sized sectors specified along the circumference of the circle, as further described below with reference to FIG. 21. As necessary, the spine groups 303 are placed outward to avoid overlap.

Method Overview

Figure 16:
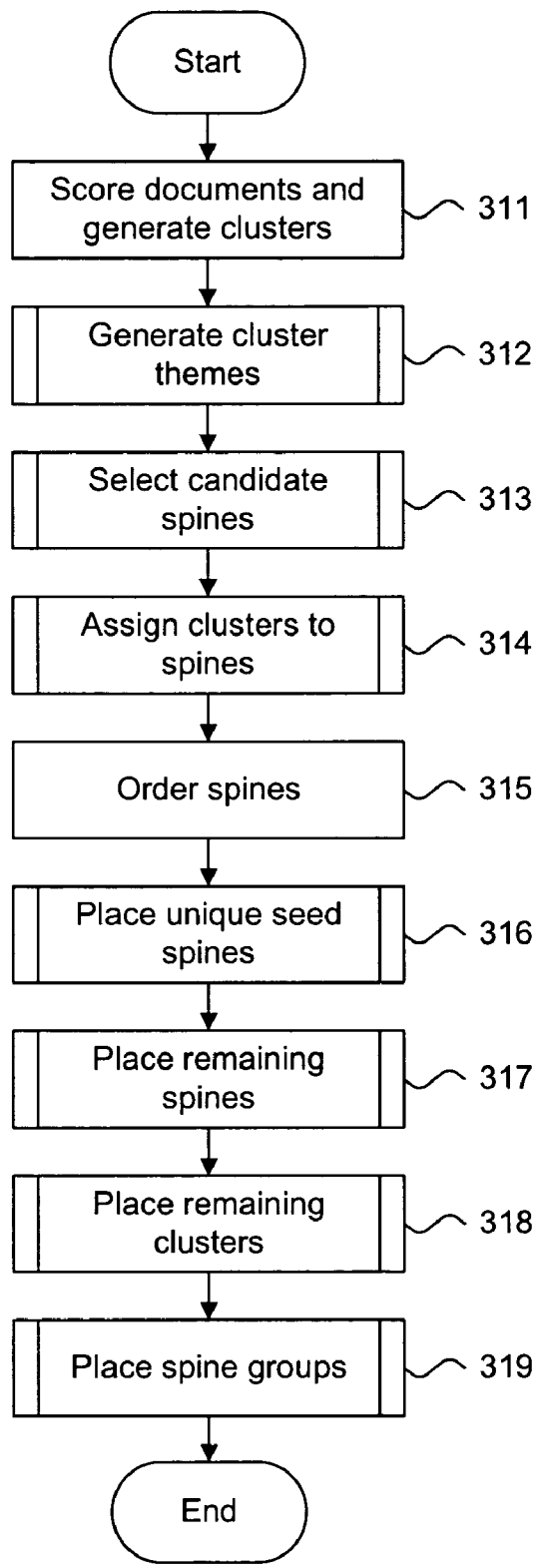
FIG. 16 is a flow diagram showing a method for arranging concept clusters in thematic neighborhood relationships in a shaped two-dimensional visual display space, in accordance with a further embodiment.

FIG. 16 is a flow diagram showing a method 310 for arranging concept clusters in thematic neighborhood relationships in a shaped two-dimensional visual display space 43, in accordance with a further embodiment. The method 310 is described as a sequence of process operations or steps, which can be executed, for instance, by a display generator 32 (shown in FIG. 1).

As an initial step, documents 14 are scored and clusters 50 are generated (block 311), such as described in commonly-assigned U.S. patent application Ser. No. 10/626,984, filed Jul. 25, 2003, pending, the disclosure of which is incorporated by reference. Next, one or more cluster concepts 53, that is, "themes," are generated for each cluster 50 based on cumulative cluster concept scores 51 (block 312), as further described above with reference to FIG. 4. The cluster concepts 53 are used to select candidate spines 55 (block 313), as further described above with reference to FIG. 5, and the clusters 50 are then assigned to the candidate spines 55 as best fit spines 56 (block 314), as further described above with reference to FIG. 6.

Spine groups 303 are then formed and placed within the visualization 43 in the display space, as follows. First, the best fit spines 56 are ordered based on spine length using, for instance, the number of clusters 50 contained in the spine (block 315). Thus, longer best fit spines 56 are selected first. Other orderings of the best fit spines 56 are possible. Unique seed spines are identified from the ordered best fit spines 56 and placed to create best fit spines (block 316), as further described above with reference to FIG. 7. Any remaining unplaced non-seed best fit spines 56 are identified and placed with the placed seed best fit spines 56 (block 317), as further described below with reference to FIG. 17. Similarly, any remaining unplaced singleton clusters 50 are identified and placed as loose "grafts" to the placed best fit spines 56 (block 317), as further described below with reference to FIG. 18. Finally, the spine groups 303, which include the placed best fit spines 56 and the loosely grafted singleton clusters 50, are placed within the visualization 43 (block 319), as further described below with reference to FIG. 20. In the described embodiment, each of the spine groups is placed in a radial layout circumferential to a logically defined circle so as to avoid overlap with other spine groups. The radial layout facilitates improved user interface features through increased cluster spine group density and provides a cluster spine group placement allowing improved descriptive labeling. Other cluster, spine, and spine group placement methodologies could also be applied based on similarity, dissimilarity, attraction, repulsion, and other properties in various combinations, as would be appreciated by one skilled in the art. The method then terminates.

Cluster Assignment

Figure 17:
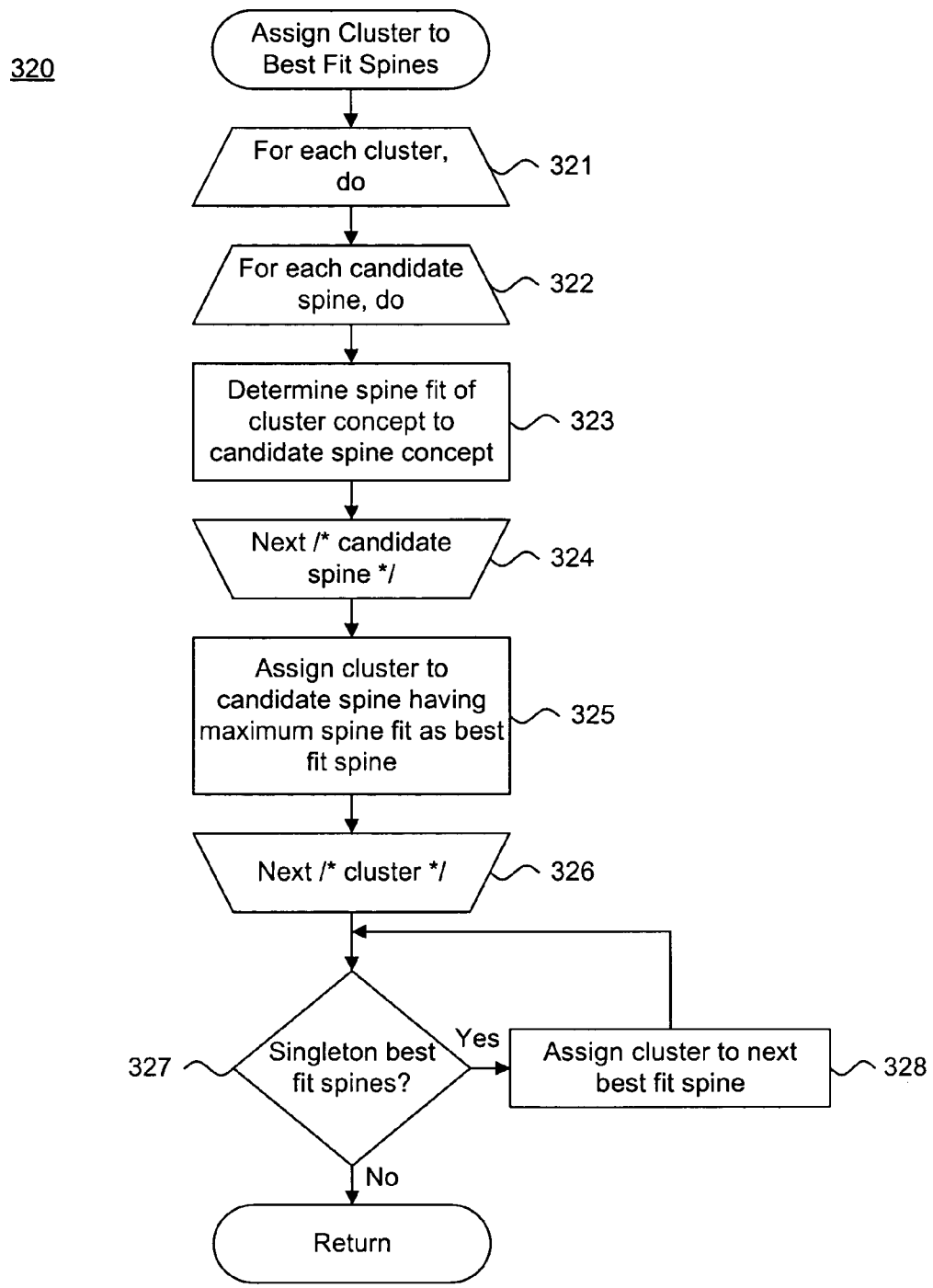
FIG. 17 is a flow diagram showing the routine for assigning clusters to best fit candidate spines for use in the method of FIG. 16.

FIG. 17 is a flow diagram showing the routine 320 for assigning clusters 50 to best fit candidate spines 56 for use in the method 310 of FIG. 16. One purpose of this routine is to match each cluster 50 to a best fit candidate spine 56.

The best fit spines 56 are evaluated by iteratively processing through each cluster 50 and candidate spine 55 (blocks 321-326 and 322-324, respectively). During each iteration for a given cluster 50 (block 321), the spine fit of a cluster concept 53 to a candidate spine concept 54 is determined (block 323) for a given candidate spine 55 (block 322). In the described embodiment, the spine fit F is calculated according to the following equation:

$$F = \log\left(\frac{v}{r^2}\right) \times w$$

where v is defined as the number of clusters 50 containing the candidate spine concept 54 as a cluster concept 53, v is defined as the rank order of the cluster concept 53, and w is defined as bias factor. In the described embodiment, a bias factor of 5.0 is used for user-specified concepts, while a bias factor of 1.0 is used for all other concepts. Processing continues with the next candidate spine 55 (block 324). Next, the cluster 50 is assigned to the candidate spine 55 having a maximum spine fit as a best fit spine 56 (block 325). Processing continues with the next cluster 50 (block 326). Finally, any best fit spine 56 that attracts only a single cluster 50 is discarded (block 327) by assigning the cluster 50 to a next best fit spine 56 (block 328). The routine returns.

In a further embodiment, each cluster 50 can be matched to a best fit candidate spine 56 as further described above with reference to FIG. 6.

Remaining Cluster Spine Placement

Figure 18:
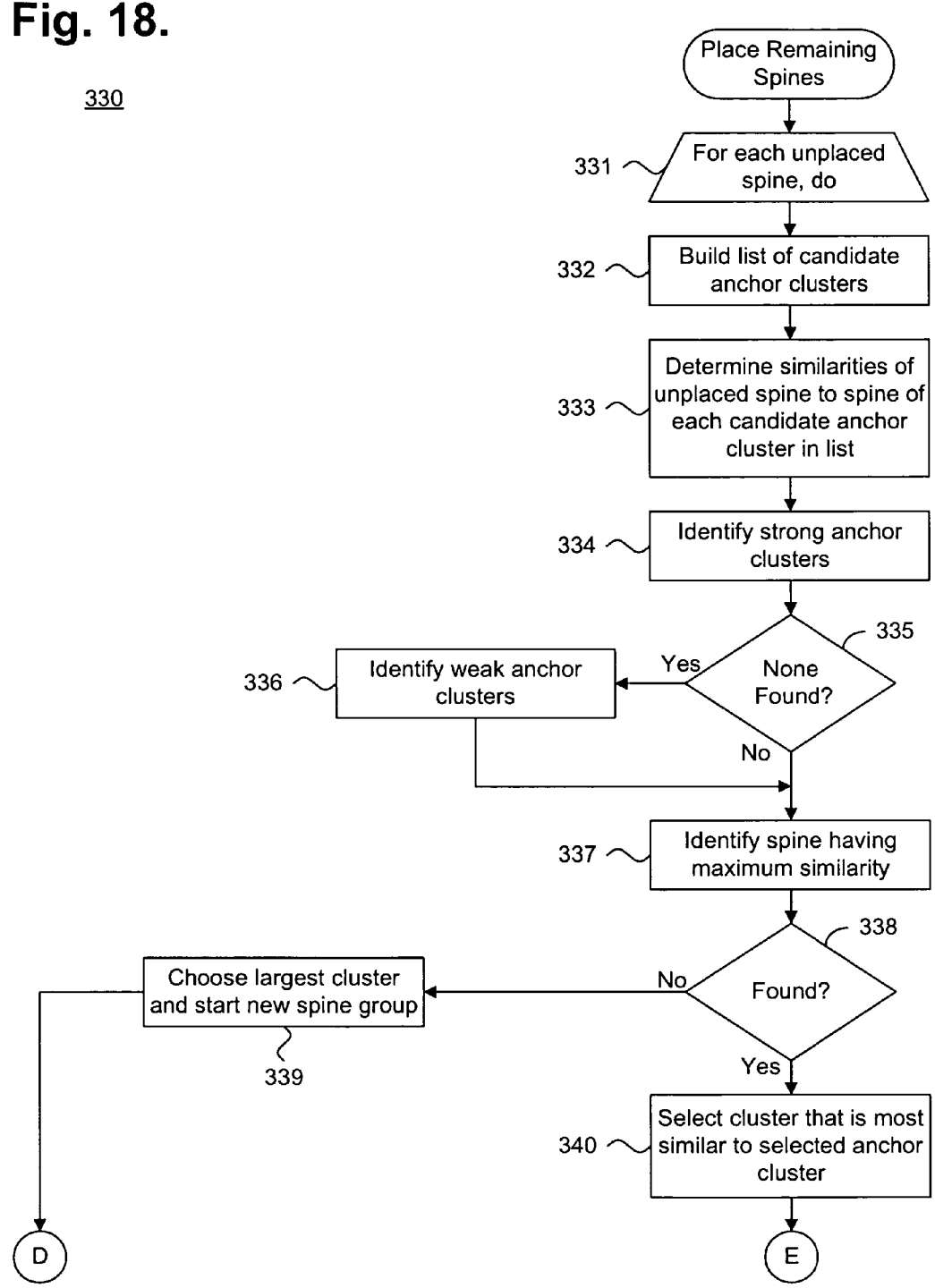
FIG. 18 is a flow diagram showing the routine for placing remaining cluster spines for use in the method of FIG. 16.
Figure 18:
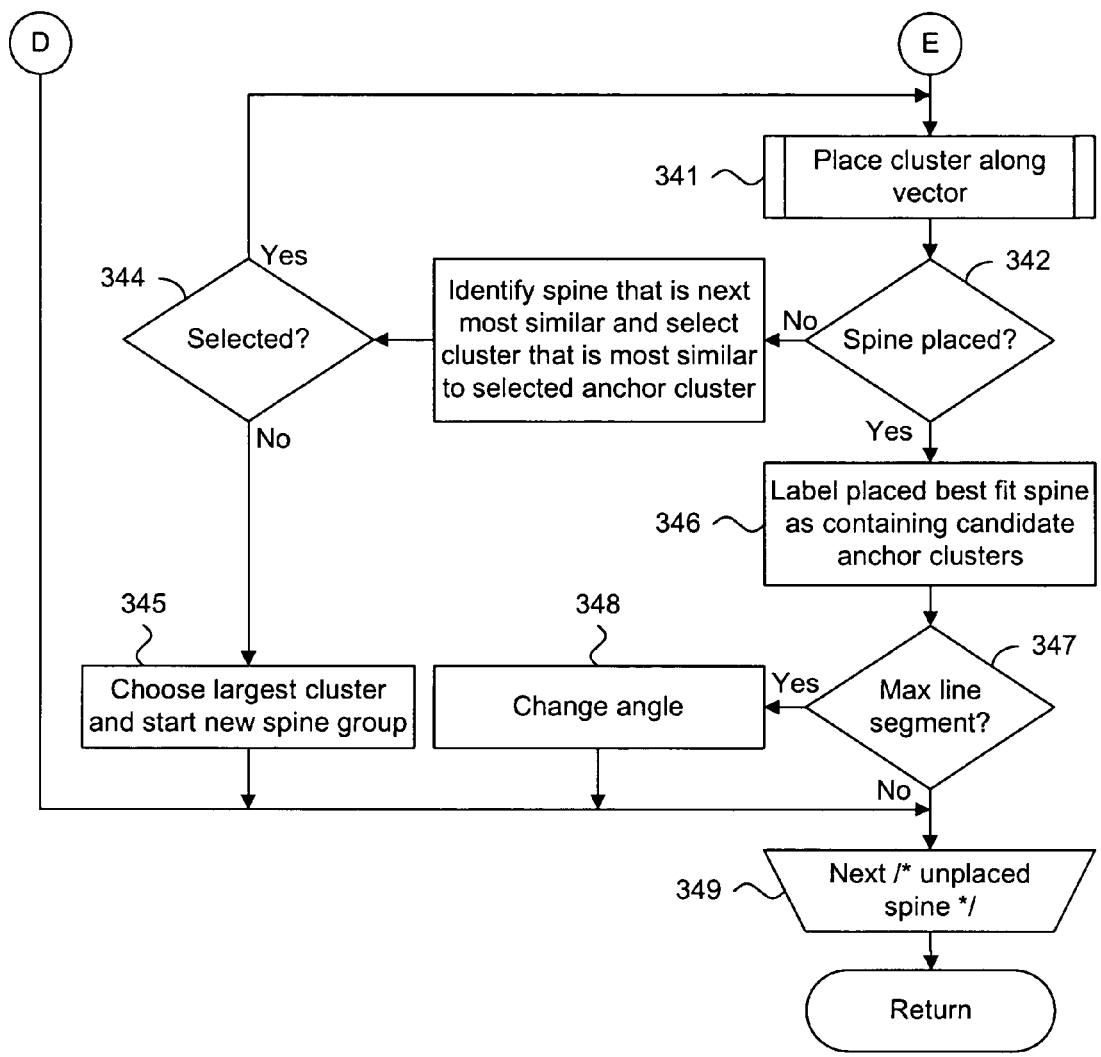

FIG. 18 is a flow diagram showing the routine 330 for placing remaining cluster spines 56 for use in the method 310 of FIG. 16. The remaining cluster spines 56 are those cluster spines that are non-seed best fit spines 56. The purpose of the routine is to graft each remaining cluster spine 56 onto an already-placed seed best fit spine 56 having the closest similarity with a connecting line drawn in the visualization 43 to indicate relatedness.

Each of the remaining unplaced cluster spines 56 is iteratively processed (blocks 331-349), as follows. For each unplaced cluster spine 56 (block 331), a list of candidate anchor clusters 60 is first built from the set of placed seed best fit spines 56 (block 332). In the described embodiment, a candidate anchor cluster 60 has been placed in a best fit spine 56, has at least one open edge for grafting a cluster spine 56, and belongs to a best fit spine 56 that has a minimum similarity of 0.1 with the unplaced cluster spine 56, although other minimum similarity values are possible. The similarities between the unplaced cluster spine 56 and the best fit spine of each candidate anchor cluster 60 in the list are determined (block 333). The similarities can be determined by taking cosine values over a set of group concept score vector 304 formed by aggregating the concept scores for all clusters 56 in the unplaced cluster spine 56 and in the best fit spine of each candidate anchor cluster 60 in the list. Strong candidate anchor clusters 60, which contain the same concept as the unplaced cluster spine 56, are identified (block 334). If no qualified placed anchor clusters 60 are found (block 335), weak candidate anchor clusters 60, which, like the strong candidate anchor clusters 60, are placed, have an open edge, and reflect the minimum best fit spine similarity, are identified (block 336).

Next, the unplaced cluster spine 56 is placed. During spine placement (blocks 338-348), the strong candidate anchor clusters 60 are selected before the weak candidate anchor clusters 60. The best fit spine 56 having a maximum similarity to the unplaced cluster spine 56 is identified (block 337). If a suitable best fit spine 56 is not found (block 338), the largest cluster 60 on the unplaced cluster spine 56 is selected and the unplaced cluster spine 56 becomes a new spine group 303 (block 339). Otherwise, if a best fit spine 56 is found (block 338), the cluster 60 on the unplaced cluster spine 56 that is most similar to the selected anchor cluster 60 is selected (block 340). The unplaced cluster spine 56 is placed by grafting onto the previously placed best fit spine 56 along a vector defined from the center of the anchor cluster 55 (block 341), as further described above with reference to FIG. 12. If any of the spine clusters are not placed (block 342), the best fit spine 56 having the next closest similarity to the unplaced cluster spine 56 is identified and the cluster on the unplaced cluster spine 56 that is most similar to the selected anchor cluster 60 is selected (block 343), as further described above with reference to FIG. 9. Assuming another anchor cluster 60 is selected (block 344), the unplaced cluster spine 56 is again placed (block 341), as further described above with reference to FIG. 12. Otherwise, if another anchor cluster 60 is not selected (block 344), the largest cluster 60 on the unplaced cluster spine 56 is selected and the unplaced cluster spine 56 becomes a new spine group 303 (block 345).

If the unplaced cluster spine 56 is placed (block 342), the now-placed best fit spine 56 is labeled as containing candidate anchor clusters 60 (block 346). If the current vector forms a maximum line segment (block 347), the angle of the vector is changed (block 348). In the described embodiment, a maximum line segment contains more than 25 clusters 50, although any other limit could also be applied. Processing continues with each remaining unplaced best fit spine 56 (block 349), after which the routine then returns.

Remaining Cluster Placement

Figure 19:
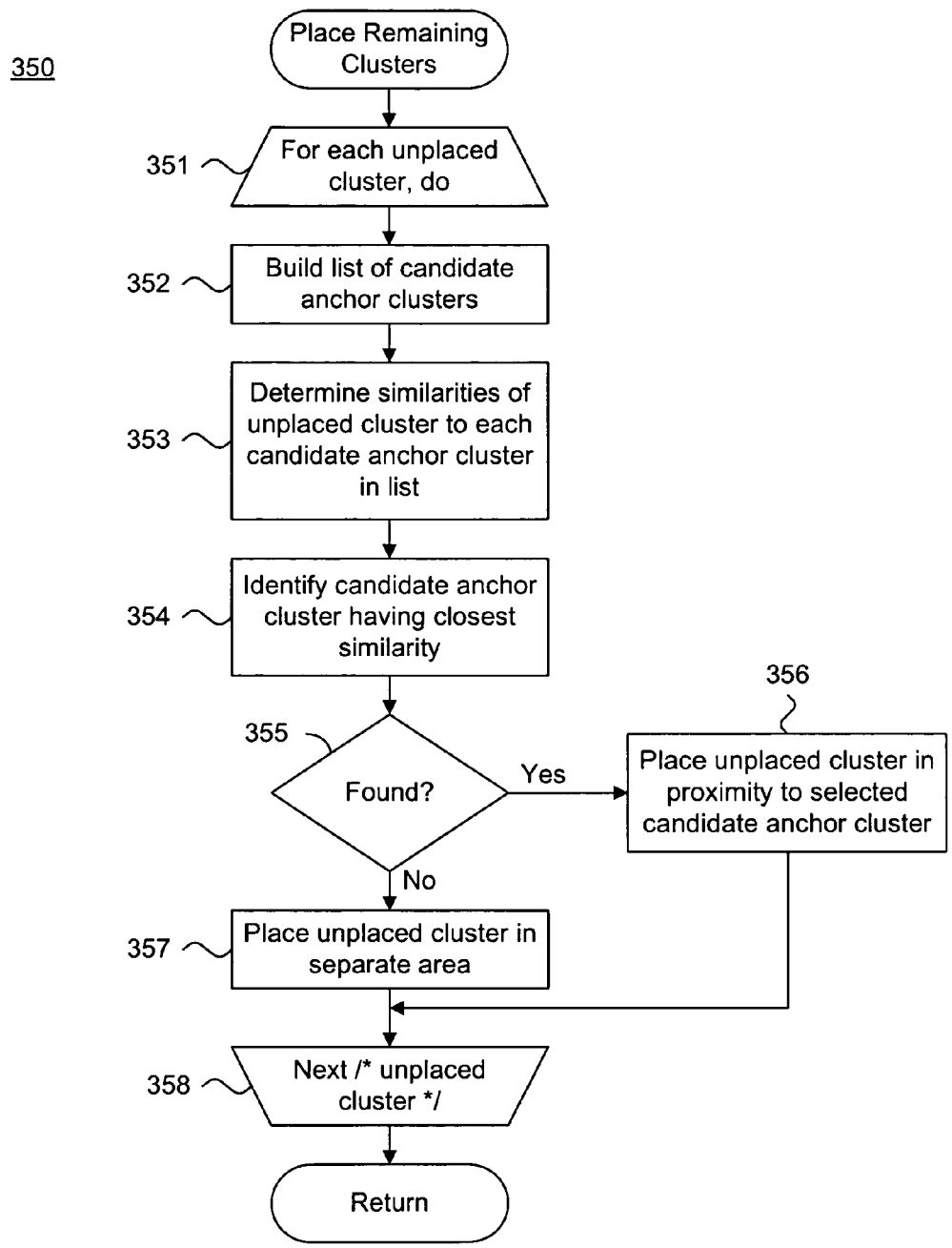
FIG. 19 is a flow diagram showing the routine for placing remaining clusters for use in the method of FIG. 16.

FIG. 19 is a flow diagram showing the routine 350 for placing remaining clusters 50 for use in the method 310 of FIG. 16. The remaining clusters 60 are those clusters that failed to share a sufficient similarity with a best fit spine 56. The purpose of the routine is to loosely graft each remaining cluster 60 in close proximity to an already-placed seed best fit spine 56 in a spine group 303. The placement is based on a weaker connection to the selected best fit spine 56 by proximity alone with no connecting line drawn in the visualization 43 to indicate relatedness.

Each of the remaining unplaced clusters 60 is iteratively processed (blocks 351-358), as follows. For each unplaced cluster 60, a list of candidate anchor clusters 60 is first built from the set of placed seed best fit spines 56 (block 352). In the described embodiment, a candidate anchor cluster 60 has at least one open edge for grafting a cluster 60. The similarities between the unplaced cluster 60 and each candidate anchor cluster 60 in the list are determined (block 353). The similarities can be determined by taking cosine values of the respective clusters 60. The candidate anchor cluster 60 having the closest similarity to the unplaced cluster 60 is identified (block 354). If a sufficiently similar candidate anchor cluster 60 found (block 355), the unplaced cluster 60 is placed in proximity to the selected candidate anchor cluster 60 (block 356). Otherwise, the unplaced cluster 60 are placed in a display area of the visualization 43 separately from the placed best fit spines 56 (block 357). Processing continues with each remaining unplaced cluster 60 (block 358), after which the routine then returns.

Example Cluster Spine Group

Figure 20:
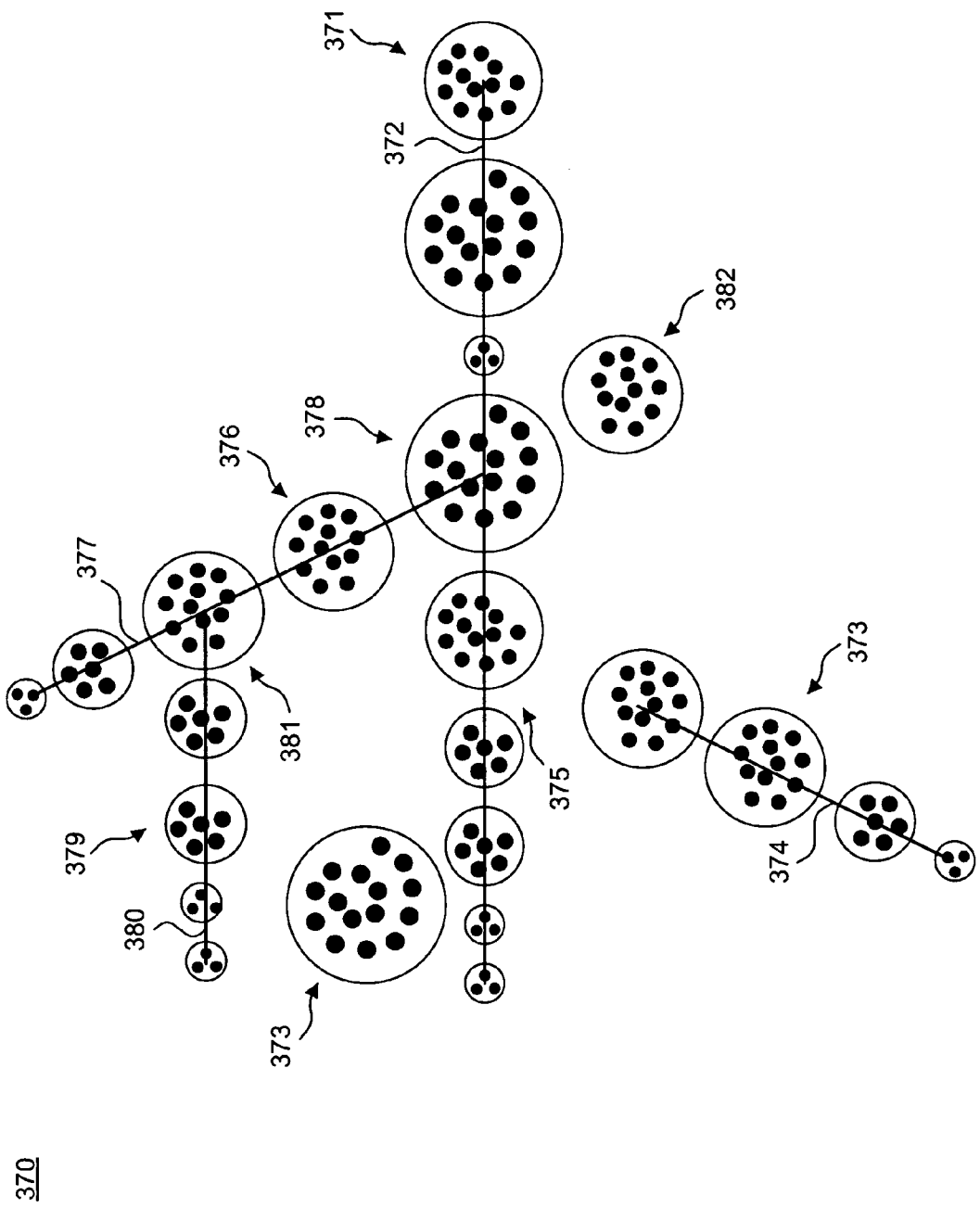
FIG. 20 is a data representation diagram showing, by way of example, a cluster spine group.

FIG. 20 is a data representation diagram showing, by way of example, a cluster spine group 370. A set of individual best fit spines 371, 373, 376, 379 are created by assigning clusters 50 sharing a common best fit theme. The best fit spines are ordered based on spine length and the longest best fit spine 371 is selected as an initial unique seed spine. Each of the unplaced remaining best fit spines 373, 376, 379 are grafted onto the placed best fit spine 371 by first building a candidate anchor cluster list. If possible, each remaining best fit spine 376, 379 is placed at an anchor cluster 378, 381 on the best fit spine that is the most similar to the unplaced best fit spine. The best fit spines 371, 376, 379 are placed along a vector 372, 377, 379 with a connecting line drawn in the visualization 43 to indicate relatedness. Otherwise, each remaining best fit spine 373 is placed at a weak anchor 375 with a connecting line 374 drawn in the visualization 43 to indicate relatedness. However, the connecting line 374 does not connect to the weak anchor 375. Relatedness is indicated by proximity only.

Next, each of the unplaced remaining singleton clusters 382 are loosely grafted onto a placed best fit spine 371, 376, 379 by first building a candidate anchor cluster list. Each of the remaining singleton clusters 382 are placed proximal to an anchor cluster 60 that is most similar to the singleton cluster. The singleton clusters 382 are placed along a vector 372, 377, 379, but no connecting line is drawn in the visualization 43. Relatedness is indicated by proximity only.

Cluster Spine Group Placement

Figure 21:
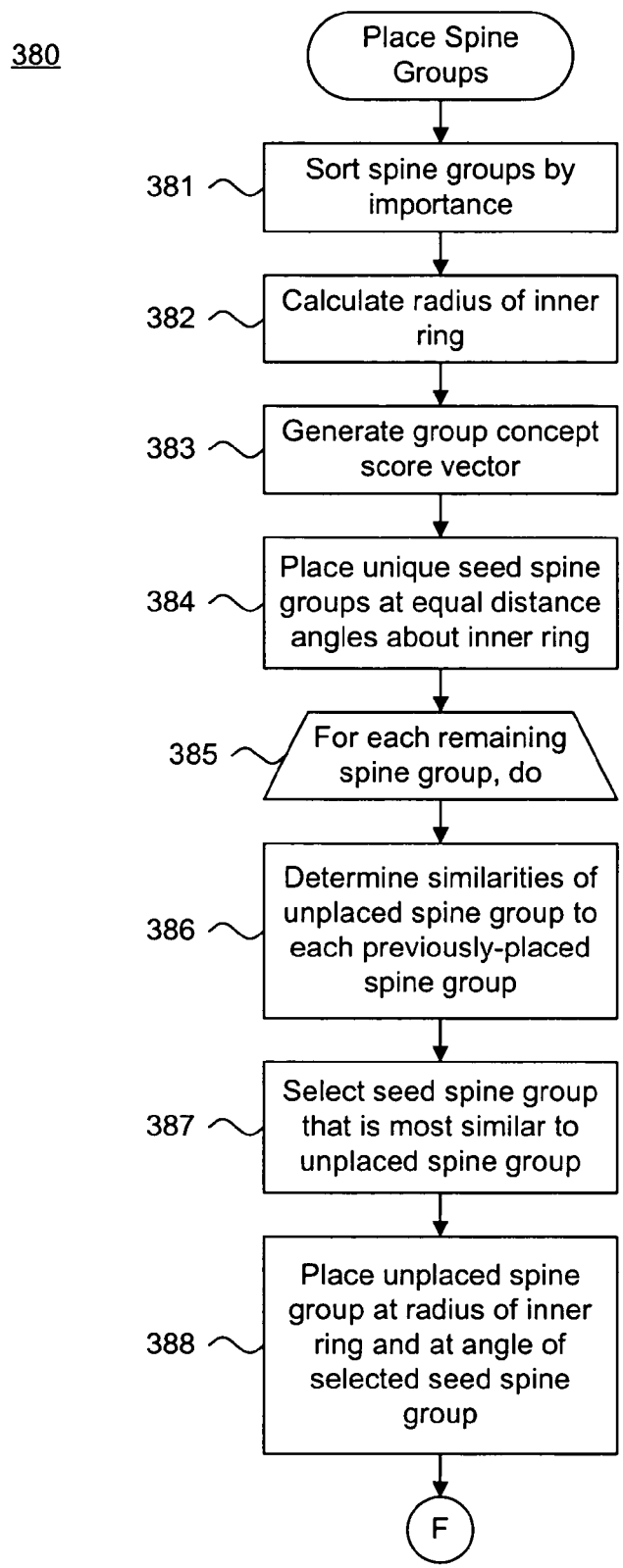
FIG. 21 is a flow diagram showing the routine for placing cluster spine groups for use in the method of FIG. 16.
Figure 21:
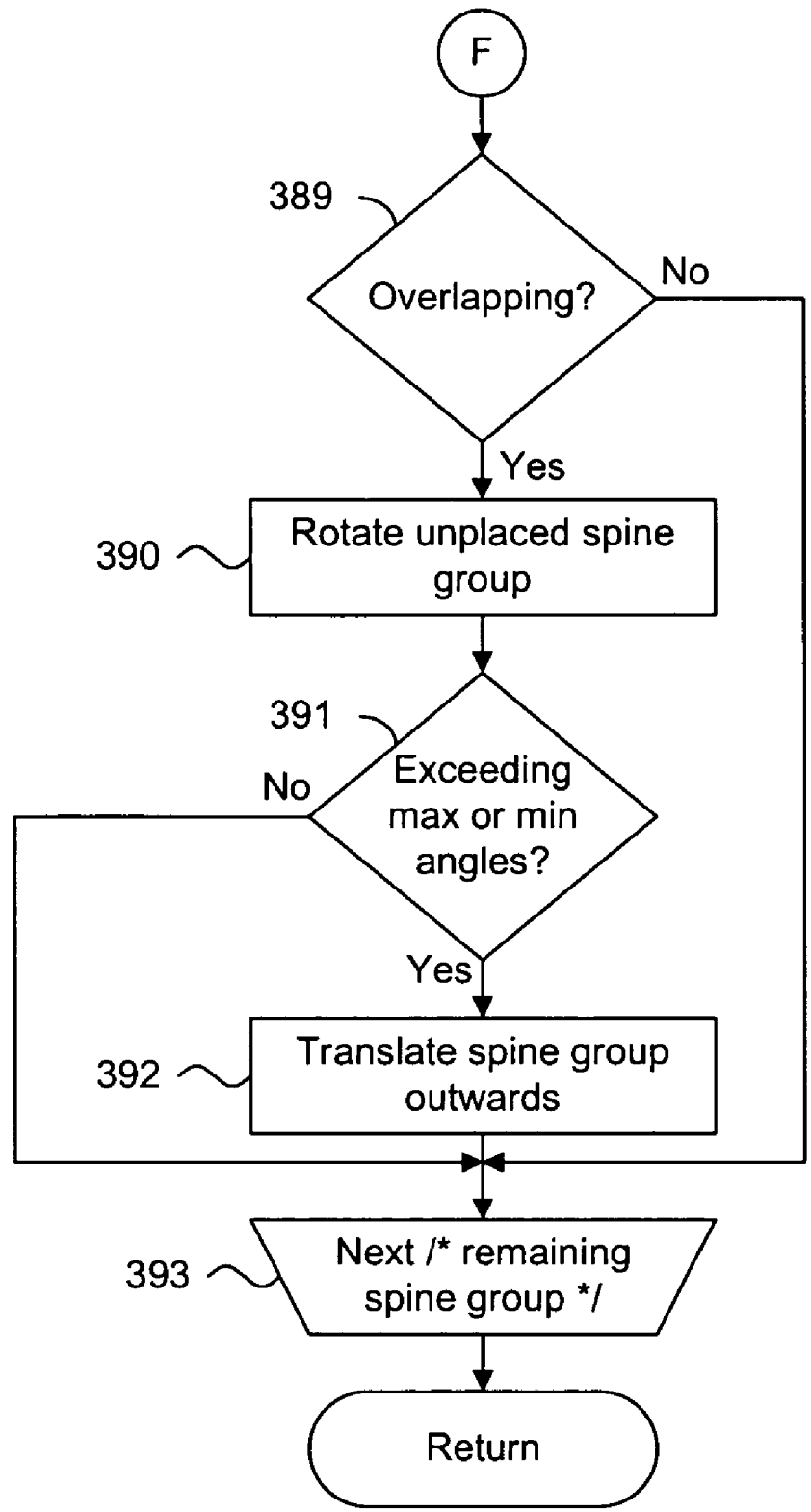

FIG. 21 is a flow diagram showing the routine 380 for placing spine groups 303 for use in the method 310 of FIG. 16. Spine groups 303 include the placed best fit spines 56 with grafted best fit spines 56 and loosely grafted singleton clusters 50. The purpose of this routine is to place the spine groups 303 within a radial layout defined within the visualization 43 in the display space in semantically meaningful order.

Figure 22:
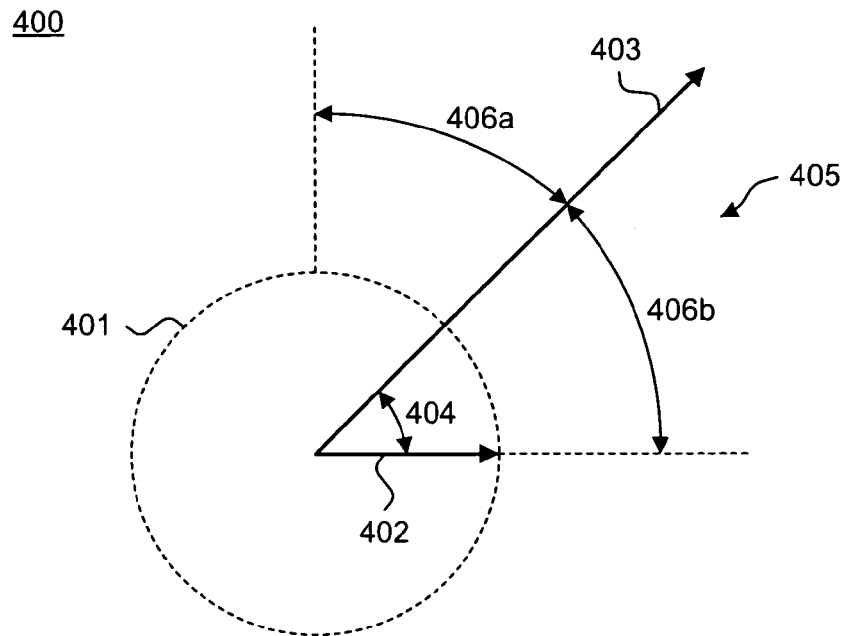
FIG. 22 is a data representation diagram showing, by way of example, a radially-oriented layout.

The spine groups 303 are first sorted by order of importance (block 381). In the described embodiment, the spine groups 303 are sorted by size and concept emphasized state, which corresponds to specific user-specified selections. The spine groups 303 are arranged circumferentially to a central shape defined logically within the visualization 43. In the described embodiment, a circle is defined within the visualization 43. Referring to FIG. 22, a data representation diagram shows, by way of example, a radially-oriented layout 400. The spine groups 303 are placed within a set of three concentric circles. An innermost circle 401 with radius 402 contains four distinct seed spine groups 303 placed along a central vector 403 evenly spaced within quarter circle sectors 405, although other numbers of seed spine groups 303 are possible. Within each sector 405, each of the four spine groups 303 are rotated to an initial target angle 404 along the central vector 403. Remaining spine groups 303 are placed within the sector 405 up to a maximum angle 406a or minimum angle 406b relative to the initial target angle 404. The spine groups 303 are moved outwards away from the center of the circle as necessary to avoid overlap, as further described below with reference to FIG. 24. The majority of the spine groups 303 fall within a primary circle logically defined outside the innermost circle 401. A third outermost circle can be used by a user interface to delineate an area for descriptive label placement.

Referring back to FIG. 21, the radius of the innermost circle 401 is calculated (block 382). In the described embodiment, the radius r is calculated in accordance to equation (1):

$$r = \frac{\text{Seeds} \times \text{MaxY}}{2} \cdot \pi \quad (1)$$

where Seeds is a number of initial seed spine groups 303 to be placed circumferentially to the innermost circle 401 and MaxY is a maximum extent along a y-axis of the placed best fit candidate spine groups 303. A group concept score vector 304 is generated (block 383) by aggregating the cluster theme concepts for each spine group 303. In the described embodiment, the group concept score vector 304 is limited to the top 50 concepts based on score, although other limits could also be used. The set of unique seed spine groups 303 are selected and placed at equal distance angles about the innermost circle 401 (block 384). The unique seed spine groups 303 are chosen such that each unique seed spine group 303 is sufficiently dissimilar to the previously-placed unique seed spine groups 303. In the described embodiment, a cosine value of at least 0.2 is used, although other metrics of cluster spine group dissimilarity are possible. Each of the unique seed spine groups 303 are translated to the x-axes, where x=0.5×radius r and y=0.0, and are further rotated or moved outwards away from the innermost circle 401 to avoid overlap.

Figure 24:
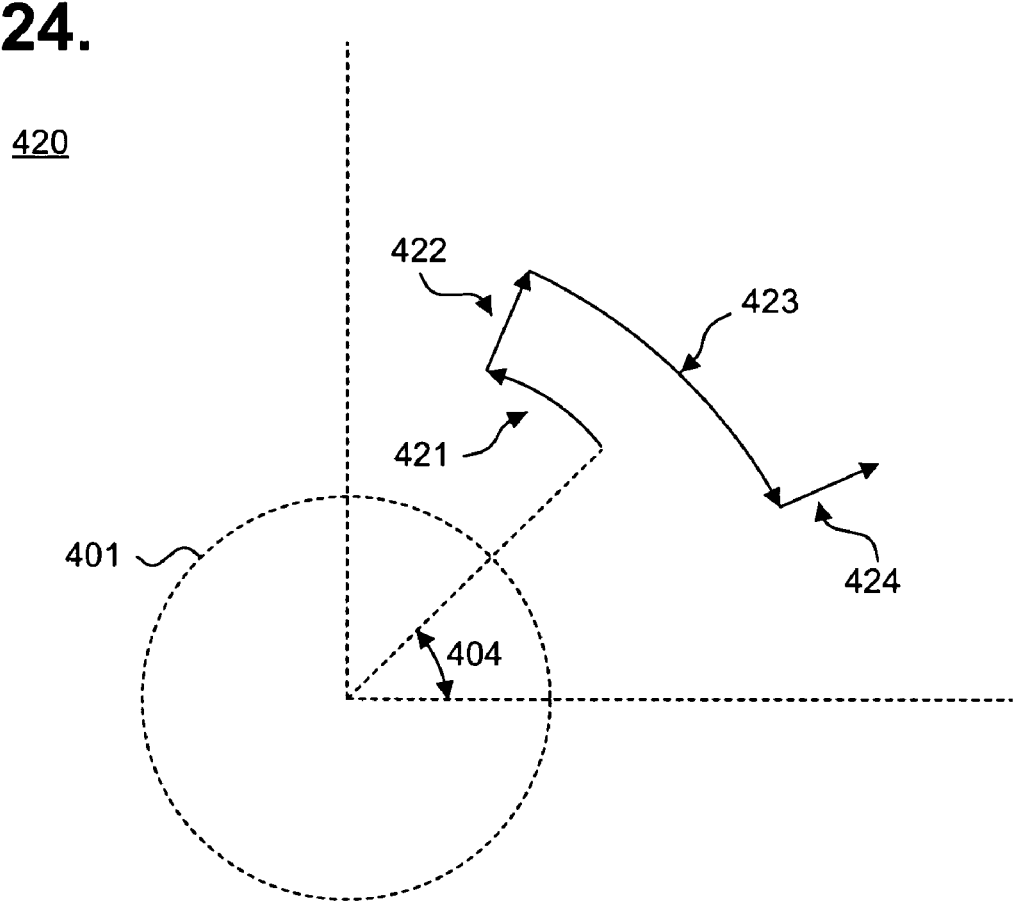
FIG. 24 is a data representation diagram showing, by way of example, cluster spine group overlap removal.

Each of the remaining spine groups 303 are iteratively processed (blocks 385-393), as follows. The similarities of each unplaced spine group 303 to each previously-placed spine group 303 are determined (block 386) and the seed spine group 303 that is most similar to the unplaced spine group 303 is selected (block 387). The unplaced spine group 303 is placed at the radius 402 of the innermost circle 401 at the angle 404 of the selected seed spine group 303 (block 388). If the unplaced spine group 303 overlaps any placed spine group 303 (block 389), the unplaced spine group 303 is rotated (block 390). However, if the unplaced spine group 303 exceeds the maximum angle 406a or minimum angle 406b after rotation (block 391), the unplaced spine group 303 is translated outwards and rotated in an opposite direction until the overlap is removed (block 392). Referring to FIG. 24, a data representation diagram 420 shows, by way of example, cluster spine group overlap removal. An overlapping cluster spine group 303 is first rotated in an anticlockwise direction 421 up to the maximum angle 406a and, if still overlapping, translated in an outwards direction 422. Rotation 423 and outward translation 424 are repeated until the overlap is resolved. Referring back to FIG. 21, processing continues with each remaining unplaced spine group 303 (block 393), after which the routine then returns.

Cluster Spine Group Placement Example

Figure 23A:
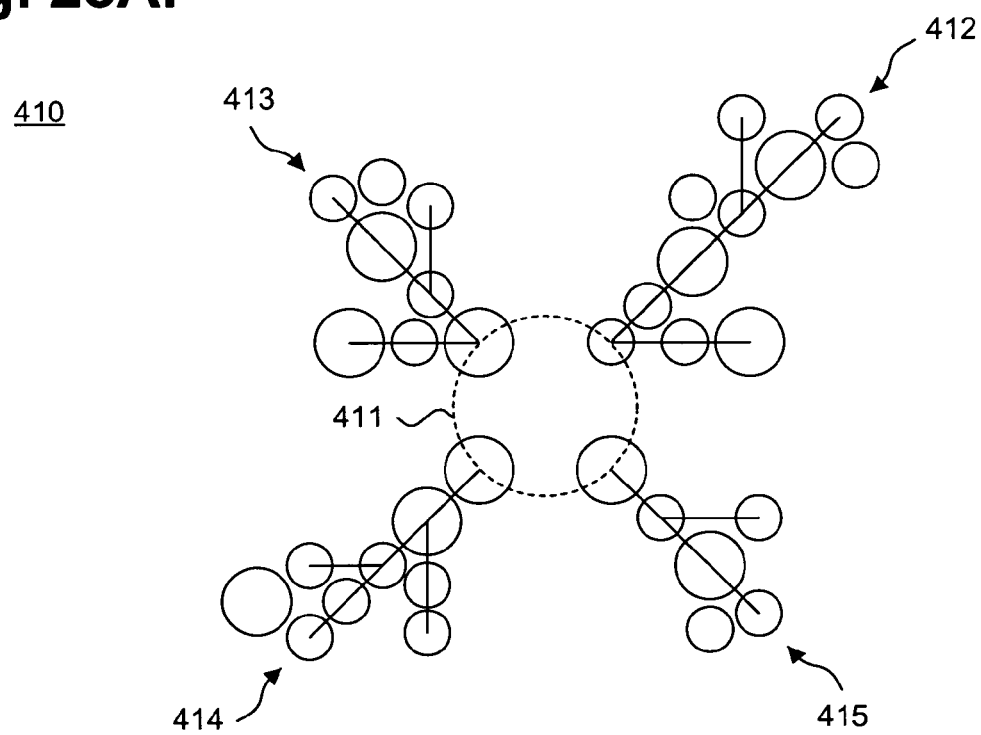
FIGS. 23A-C are data representation diagrams showing, by way of examples, cluster spine group placements.
Figure 23B:
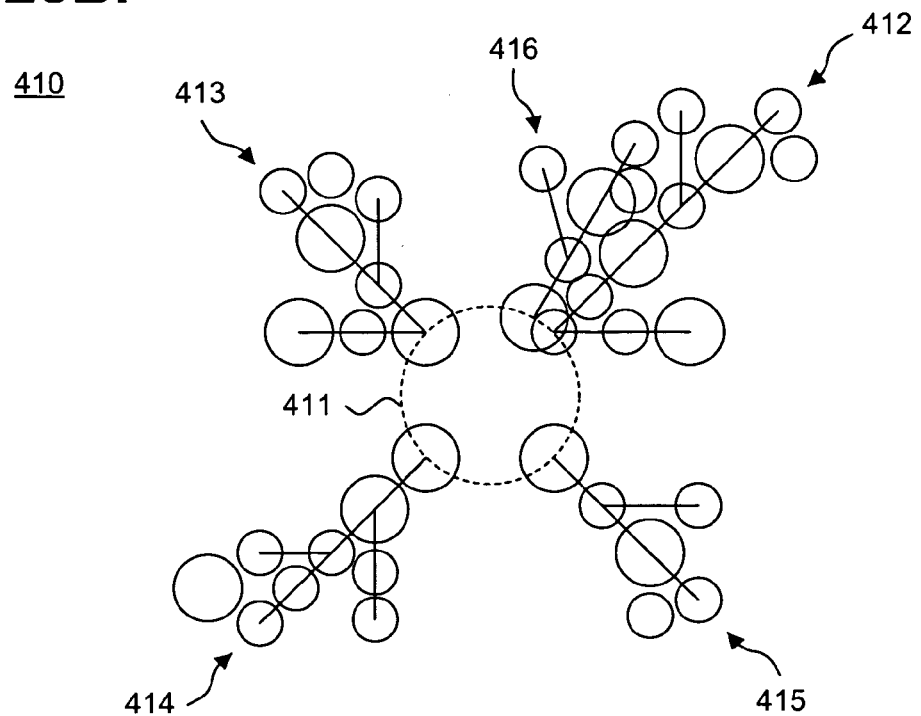
Figure 23C:
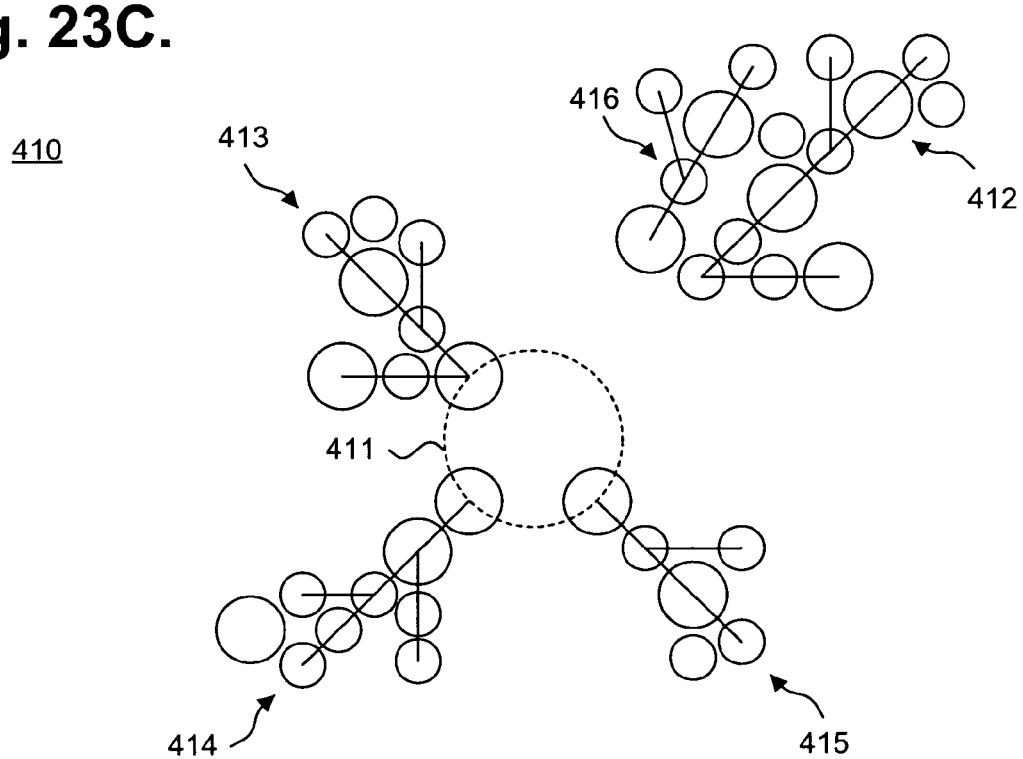

FIGS. 23A-C are data representation diagrams showing, by way of examples, cluster spine group placements 410. Referring first to FIG. 23A, an initial set of seed cluster spine groups 412-415 are shown evenly spaced circumferentially to an innermost circle 411. No clusters 60 assigned to each seed cluster spine group overlap the sector 405 in which the corresponding seed cluster spine group is placed. Referring next to FIG. 23B, an unplaced cluster spine group 416 overlaps already-placed cluster spine group 412. Rotating the unplaced cluster spine group 416 further is not possible, since the one or more of the clusters would cross over into the next sector 405. Referring finally to FIG. 23C, the entire set of cluster spine groups 412, 416 are translated outwards from the innermost circle 411 until no longer overlapping.

While the invention has been particularly shown and described as referenced to the embodiments thereof, those skilled in the art will understand that the foregoing and other changes in form and detail may be made therein without departing from the spirit and scope of the invention.

What is claimed is:

1. A system for arranging concept clusters in thematic neighborhood relationships in a shaped two-dimensional visual display space, comprising:

a clustering module to select a set of clusters from a concept space comprising a multiplicity of clusters with concepts extracted to visualize document content;

a theme generator to identify a theme in each of a plurality of the clusters, each theme comprising at least one such concept ranked within the cluster;

a spine placement module to logically form a plurality of best fit of candidate spines comprising clusters sharing at least one common theme by assigning one or more of the clusters to one or more candidate spines having a substantially best fit, to identify one or more of the best fit candidate spines sufficiently unique from each other such best fit candidate spine and to place the identified best fit candidate spines in a visual display space; and a spine group placement module to evaluate a similarity between each non-identified best fit candidate spine and each previously placed best fit candidate spine and to place each non-identified best fit candidate spine in the visual display space relative to an anchor cluster on one of the previously placed best fit candidate spines that is sufficiently similar to the non-identified best fit candidate spine.

2. A system according to claim 1, further comprising:
an evaluator to evaluate each of the plurality of concepts against an acceptance criteria to qualify as the theme of the cluster, wherein the acceptance criteria comprises at least one of being contained in a seed theme of a cluster and being contained in a predetermined minimum of the documents.

3. A system according to claim 1, further comprising:
an evaluator to evaluate each candidate spine against an acceptance criteria, wherein the acceptance criteria comprises the at least one such concept being contained in at least one of a plurality of the plurality of clusters and within a predetermined maximum of the plurality of clusters.

4. A system according to claim 1, further comprising:
a best fit evaluator to determine a spine fit between the concept in each cluster and the at least one theme commonly shared by the clusters in each of the candidate spines, and to select the spine fit comprising a maximum spine fit as the substantially best fit, wherein the spine fit is calculated in accordance to an equation:

$$F = \log\left(\frac{v}{r^2}\right) \times w$$

where v is defined as a number of clusters containing each concept in the candidate spine, r is defined as a rank order of the concept, and w is defined as a bias factor.

5. A system according to claim 1, further comprising:
a vector generator to generate a spine concept score vector for each best fit candidate spine, and to evaluate a similarity between one of the best fit candidate spines and each other such other such best fit candidate spine.

6. A system according to claim 1, further comprising:
an evaluator to determine a cosine similarity between a spine for at least one anchor cluster candidate and a non-identified best fit candidate spine, and to identify the at least one such anchor cluster candidate with acceptable similarity as a spine for an anchor cluster.

7. A system according to claim 1, wherein the best fit candidate spines are ordered by length.

8. A system according to claim 1, further comprising:
a list builder to build a list of the anchor clusters from the previously placed best fit candidate spines subject to an acceptance criteria.

9. A system according to claim 8, wherein the acceptance criteria for a strong anchor cluster comprises at least one of being placed in one of the best fit spines, containing a same concept, having at least one open edge, and having a similarity meeting a predefined threshold.

10. A system according to claim 8, wherein the acceptance criteria for a weak anchor cluster comprises at least one of being placed in one of the best fit spines, having at least one open edge, and having a similarity meeting a predefined threshold.

11. A system according to claim 1, further comprising:
a selector to select an anchor cluster assigned to each non-identified best fit candidate spine that is not sufficiently similar to the previously placed best fit candidate spines.

12. A system according to claim 1, further comprising:
an evaluator to evaluate a similarity between each cluster not assigned to one such candidate spine and each placed cluster, and to place each non-assigned cluster in the visual display space proximal to an anchor cluster on one of the previously placed candidate spines that is sufficiently similar.

13. A system according to claim 1, wherein at least one group of previously placed best fit candidate spines is oriented circumferentially to a central shape defined logically within the visual display space.

14. A system according to claim 13, wherein the logically-defined central shape comprises an elliptical shape.

15. A system according to claim 14, wherein the elliptical shape comprises a circle having a radius calculated in accordance to an equation:

$$r = \frac{\text{Seeds} \times \text{Max}Y}{2} \cdot \pi \quad (1)$$

where Seeds is a number of initial seed spine groups to be placed circumferentially to the circle and MaxY is a maximum extent along a y-axis of the placed best fit candidate spine groups.

16. A system according to claim 14, further comprising:
a selector to select a plurality of the placed best fit candidate spine groups, to evaluate a similarity between each of the placed best fit candidate spine groups, and to locate each placed best fit candidate spine group spaced substantially regularly about the logically-defined central shape.

17. A system according to claim 16, further comprising:
an evaluator to evaluate a similarity between each non-selected placed best fit candidate spine group relative to each located placed best fit candidate spine group, and to orient each non-selected placed best fit candidate spine group that is sufficiently similar to one such located placed best fit candidate spine group.

18. A system according to claim 17, wherein the non-selected placed best fit candidate spine group is located to not overlap with the located placed best fit candidate spine groups within a sector defined for the located placed best fit candidate spine groups.

19. A system according to claim 18, wherein the non-selected placed best fit candidate spine group and the located placed best fit candidate spine groups are translated radially and outwards to avoid overlap.

20. A method for arranging concept clusters in thematic neighborhood relationships in a shaped two-dimensional visual display space, comprising:
selecting a set of clusters from a concept space comprising a multiplicity of clusters with concepts extracted to visualize document content;
identifying a theme in each of a plurality of the clusters, each theme comprising at least one such concept ranked within the cluster;
logically forming a plurality of best fit candidate spines comprising clusters sharing at least one common theme by assigning one or more of the clusters to one or more candidate spines having a substantially best fit;
identifying one or more of the best fit candidate spines sufficiently unique from each other such best fit candidate spine and placing the identified best fit candidate spines in a visual display space;

evaluating a similarity between each non-identified best fit candidate spine and each previously placed best fit candidate spine; and placing each non-identified best fit candidate spine in the visual display space relative to an anchor cluster on one of the previously placed best fit candidate spines that is sufficiently similar to the non-identified best fit candidate spine.

21. A method according to claim 20, further comprising:
evaluating each of the plurality of concepts against an acceptance criteria to qualify as the theme of the cluster, wherein the acceptance criteria comprises at least one of being contained in a seed theme of a cluster and being contained in a predetermined minimum of the documents.

22. A method according to claim 20, further comprising:
evaluating each candidate spine against an acceptance criteria, wherein the acceptance criteria comprises the at least one such concept being contained in at least one of a plurality of the plurality of clusters and within a predetermined maximum of the plurality of clusters.

23. A method according to claim 20, further comprising:
determining a spine fit between the concept in each cluster and the at least one theme commonly shared by the clusters in each of the candidate spines; and selecting the spine fit comprising a maximum spine fit as the substantially best fit, wherein the spine fit is calculated in accordance to an equation:

$$F = \log\left(\frac{v}{r^2}\right) \times w$$

where v is defined as a number of clusters containing each concept in the candidate spine, r is defined as a rank order of the concept, and w is defined as a bias factor.

24. A method according to claim 20, further comprising:
generating a spine concept score vector for each best fit candidate spine; and
evaluating a similarity between one of the best fit candidate spines and each other such other such best fit candidate spine.

25. A method according to claim 20, further comprising:
determining a cosine similarity between a spine for at least one anchor cluster candidate and a non-identified best fit candidate spine; and
identifying the at least one such anchor cluster candidate with acceptable similarity as a spine for an anchor cluster.

26. A method according to claim 20, further comprising:
ordering the best fit candidate spines by length.

27. A method according to claim 20, further comprising:
building a list of the anchor clusters from the previously placed best fit candidate spines subject to an acceptance criteria.

28. A method according to claim 27, wherein the acceptance criteria for a strong anchor cluster comprises at least one of being placed in one of the best fit spines, containing a same concept, having at least one open edge, and having a similarity meeting a predefined threshold.

29. A method according to claim 27, wherein the acceptance criteria for a weak anchor cluster comprises at least one of being placed in one of the best fit spines, having at least one open edge, and having a similarity meeting a predefined threshold.

30. A method according to claim 20, further comprising:
selecting an anchor cluster assigned to each non-identified best fit candidate spine that is not sufficiently similar to the previously placed best fit candidate spines.

31. A method according to claim 20, further comprising:
evaluating a similarity between each cluster not assigned to one such candidate spine and each placed cluster; and
placing each non-assigned cluster in the visual display space proximal to an anchor cluster on one of the previously placed candidate spines that is sufficiently similar.

32. A method according to claim 20, further comprising:
orienting at least one group of previously placed best fit candidate spines circumferentially to a central shape defined logically within the visual display space.

33. A method according to claim 32, wherein the logically-defined central shape comprises an elliptical shape.

34. A method according to claim 33, wherein the elliptical shape comprises a circle having a radius calculated in accordance to an equation:

$$r = \frac{\text{Seeds} \times \text{Max}Y}{2} \cdot \pi \quad (1)$$

where Seeds is a number of initial seed spine groups to be placed circumferentially to the circle and MaxY is a maximum extent along a y-axis of the placed best fit candidate spine groups.

35. A method according to claim 33, further comprising:
selecting a plurality of the placed best fit candidate spine groups;
evaluating a similarity between each of the placed best fit candidate spine groups; and
locating each placed best fit candidate spine group spaced substantially regularly about the logically-defined central shape.

36. A method according to claim 35, further comprising:
evaluating a similarity between each non-selected placed best fit candidate spine group relative to each located placed best fit candidate spine group; and
orienting each non-selected placed best fit candidate spine group that is sufficiently similar to one such located placed best fit candidate spine group.

37. A method according to claim 36, further comprising:
locating the non-selected placed best fit candidate spine group to not overlap with the located placed best fit candidate spine groups within a sector defined for the located placed best fit candidate spine groups.

38. A method according to claim 37, further comprising:
translating the non-selected placed best fit candidate spine group and the located placed best fit candidate spine groups radially and outwards to avoid overlap.

39. A computer-readable storage medium holding code for performing the method according to claim 20.

40. An apparatus for arranging concept clusters in thematic neighborhood relationships in a shaped two-dimensional visual display space, comprising:

means for selecting a set of clusters from a concept space comprising a multiplicity of clusters with concepts extracted to visualize document content;

means for identifying a theme in each of a plurality of the clusters, each theme comprising at least one such concept ranked within the cluster;

means for logically forming a plurality of best fit candidate spines comprising clusters sharing at least one common theme by assigning one or more of the clusters to one or more candidate spines having a substantially best fit;

means for identifying one or more of the best fit candidate spines sufficiently unique from each other such best fit candidate spine and means for placing the identified best fit candidate spines in a visual display space;

means for evaluating a similarity between each non-identified best fit candidate spine and each previously placed best fit candidate spine; and means for placing each non-identified best fit candidate spine in the visual display space relative to an anchor cluster on one of the previously placed best fit candidate spines that is sufficiently similar to the non-identified best fit candidate spine.

* * * * *

UNITED STATES PATENT AND TRADEMARK OFFICE
CERTIFICATE OF CORRECTION

PATENT NO. : 7,440,622 B2 Page 1 of 1
APPLICATION NO. : 10/911375
DATED : October 21, 2008
INVENTOR(S) : Evans It is certified that error appears in the above-identified patent and that said Letters Patent is hereby corrected as shown below:

Column 20,
Line 54, "best fit of candidate spines comprising clusters sharing" should read -- best fit candidate spines comprising clusters sharing --.

Signed and Sealed this

Fifteenth Day of September, 2009

David J. Kappos
*Director of the United States Patent and Trademark Office*